United States Patent
Galpin et al.

(10) Patent No.: US 10,834,389 B2
(45) Date of Patent: Nov. 10, 2020

(54) METHOD AND APPARATUS FOR OMNIDIRECTIONAL VIDEO CODING WITH ADAPTIVE INTRA MOST PROBABLE MODES

(71) Applicant: INTERDIGITAL VC HOLDINGS, INC., Wilmington, DE (US)

(72) Inventors: Franck Galpin, Cesson-Sevigne (FR); Fabien Racape, Cesson-Sevigne (FR); Thierry Viellard, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/334,439

(22) PCT Filed: Sep. 28, 2017

(86) PCT No.: PCT/EP2017/074624
§ 371 (c)(1),
(2) Date: Mar. 19, 2019

(87) PCT Pub. No.: WO2018/060329
PCT Pub. Date: Apr. 5, 2018

(65) Prior Publication Data
US 2019/0208200 A1 Jul. 4, 2019

(30) Foreign Application Priority Data

Sep. 30, 2016 (EP) .................... 16306271

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/157* (2014.11);
(Continued)

(58) Field of Classification Search
CPC .. H04N 19/105; H04N 19/593; H04N 19/597; H04N 19/70; H04N 19/11; H04N 19/157; H04N 19/176
See application file for complete search history.

(56) References Cited

U.S. PATENT DOCUMENTS 7,386,048 B2 * 6/2008 Sun ..................... H04N 19/197
375/240.15
2004/0247173 A1 12/2004 Nielsen et al.
(Continued)

FOREIGN PATENT DOCUMENTS

CN 101350920 1/2009
CN 101771878 7/2010
(Continued)

OTHER PUBLICATIONS

Mora et al, "Depth video coding based on intra mode inheritance from texture", APSIPA Transactions on Signal and Information Processing, vol. 3, Jan. 1, 2014, pp. 1-13.
(Continued)

*Primary Examiner* — Neil R Mikeska
(74) *Attorney, Agent, or Firm* — Jamie T. Nguyen

(57) ABSTRACT

In omnidirectional videos, only some intra prediction directions may be relevant for intra prediction. For example, for a video generated from an equi-rectangular mapping, only the horizontal directions may be relevant for intra prediction around the poles. To improve compression efficiency, we propose to reduce the number of possible directions, based on the location of the block to be encoded or decoded in the frame. In various embodiments, we may adapt the derivation of the MPM in order to take into account the reduction of intra directions depending on geometric distortions. The encoding method can also be adapted to reduce the number of modes to estimate for a block in omnidirectional videos.
(Continued)

The coding of the syntax elements representing the intra direction can also be improved.

18 Claims, 21 Drawing Sheets

(51) Int. Cl.

| | | |
|---|---|---|
| *H04N 19/176* | (2014.01) | |
| *H04N 19/70* | (2014.01) | |
| *H04N 19/597* | (2014.01) | |
| *H04N 19/157* | (2014.01) | |
| *H04N 19/593* | (2014.01) | |

(52) U.S. Cl.
CPC ......... *H04N 19/176* (2014.11); *H04N 19/593* (2014.11); *H04N 19/597* (2014.11); *H04N 19/70* (2014.11)

(56) References Cited

U.S. PATENT DOCUMENTS

| | | | | |
|---|---|---|---|---|
| 2006/0245497 | A1* | 11/2006 | Tourapis | H04N 19/533 |
| | | | | 375/240.16 |
| 2009/0003446 | A1* | 1/2009 | Wu | H04N 19/176 |
| | | | | 375/240.16 |
| 2012/0307894 | A1* | 12/2012 | Chien | H04N 19/176 |
| | | | | 375/240.12 |
| 2014/0064368 | A1* | 3/2014 | Minezawa | H04N 19/176 |
| | | | | 375/240.12 |
| 2014/0119443 | A1* | 5/2014 | Park | H04N 19/51 |
| | | | | 375/240.12 |
| 2014/0139627 | A1* | 5/2014 | Chen | H04N 19/597 |
| | | | | 348/43 |
| 2015/0016533 | A1* | 1/2015 | Pang | H04N 19/51 |
| | | | | 375/240.16 |
| 2015/0117524 | A1 | 4/2015 | Rondau Alface et al. | |
| 2015/0172544 | A1 | 6/2015 | Deng et al. | |
| 2015/0208066 | A1* | 7/2015 | Seregin | H04N 19/105 |
| | | | | 375/240.12 |
| 2016/0373743 | A1* | 12/2016 | Zhao | H04N 19/11 |
| 2018/0027257 | A1* | 1/2018 | Izumi | G06T 9/00 |
| | | | | 386/328 |

FOREIGN PATENT DOCUMENTS

| | | |
|---|---|---|
| EP | 2391130 | 11/2011 |
| JP | 2003141562 | 5/2003 |
| WO | WO2013000324 | 1/2013 |
| WO | WO2014036162 | 3/2014 |
| WO | WO2015157135 | 10/2015 |
| WO | WO18060346 | 4/2018 |

OTHER PUBLICATIONS

Da Silva et al, "Fast mode selection algorithm based on texture analysis for 3D-HEVC intra prediction", 2015 IEEE International Conference on Multimedia and Expo (ICME), Jun. 29, 2015, pp. 1-6.

Dai etal., "The most efficient tile size in tile-based cylinder panoramic video coding and its selection under restriction of bandwidth," 2007 International Conference on Multimedia & Expo, 2007 IEEE, pp. 1355-1358.

Zheng etal., "Adaptive selection of motion model for panoramic video coding," 2007 International Conference on Multimedia & Expo, 2007 IEEE, pp. 1319-1322.

Yu etal., "A framework to evaluate omnidirectional video coding schemes," 2015 IEEE International Symposium on Mixed and Augmented Reality 2015, pp. 31-36.

Djamal, et al., "Motion Estimation for Omnidirectional Images using the Adapted Block-Matching," International Journal of Image, Graphics and Signal Processing, vol. 6, No. 9,, Aug. 2014, pp. 20-26.

ISR for PCT/EP2017/074624 dated Jan. 25, 2018.

EP Search Report for Search Report for EP16306271 dated Mar. 17, 2017.

ISR for PCT/EP2017/074656 dated Dec. 20, 2017.

EP Search Report for EP16306272 dated Jan. 26, 2017.

Mora, Elie-Gabriel, "Multiview Video Plus Depth Coding for New Multimedia Services," Feb. 4, 2014, Image Processing, Telecom Paris Tech 2014.

\* cited by examiner

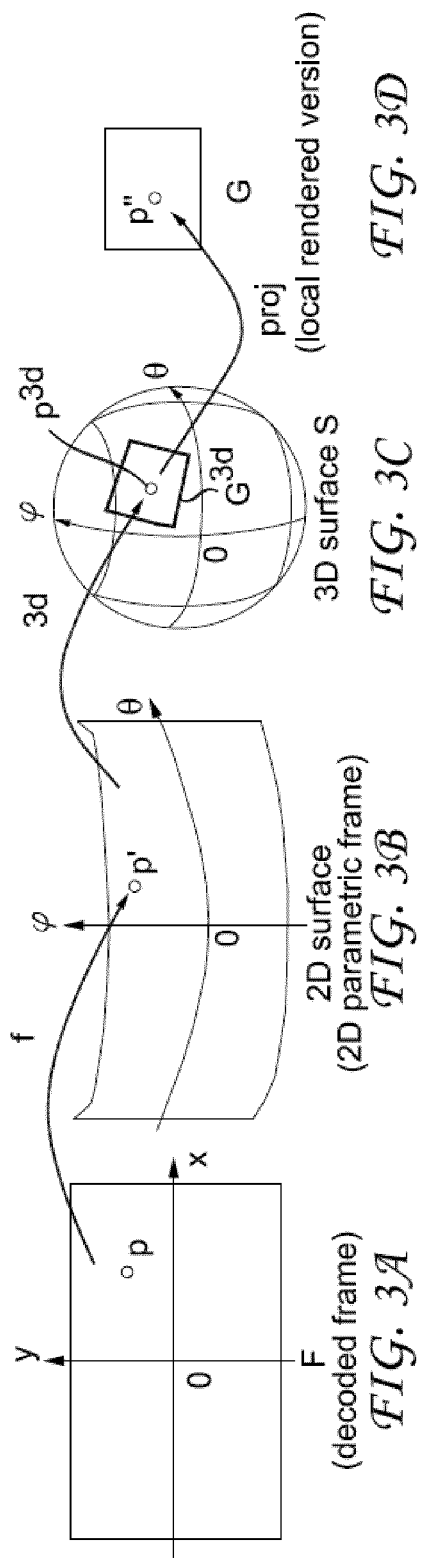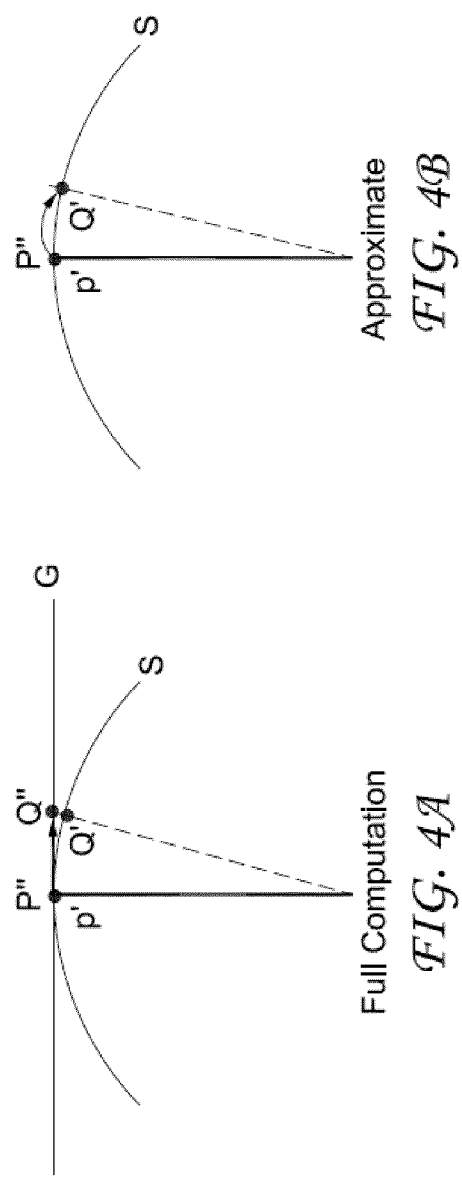
FIG. 3A  F (decoded frame)
FIG. 3B  2D surface (2D parametric frame)
FIG. 3C  3D surface S
FIG. 3D  G (local rendered version)
FIG. 4A  Full Computation
FIG. 4B  Approximate

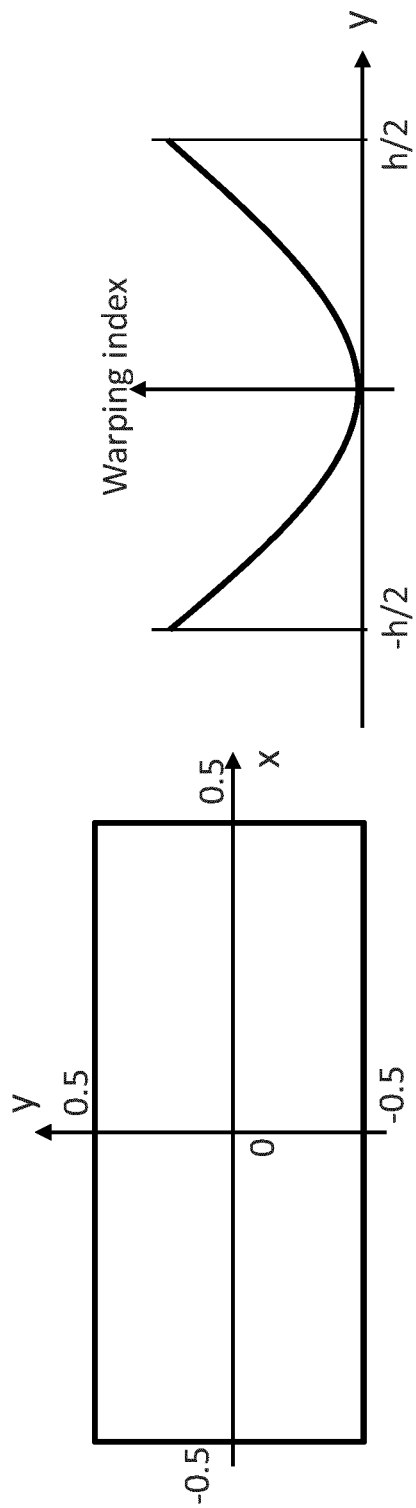
FIG. 10A
FIG. 10B
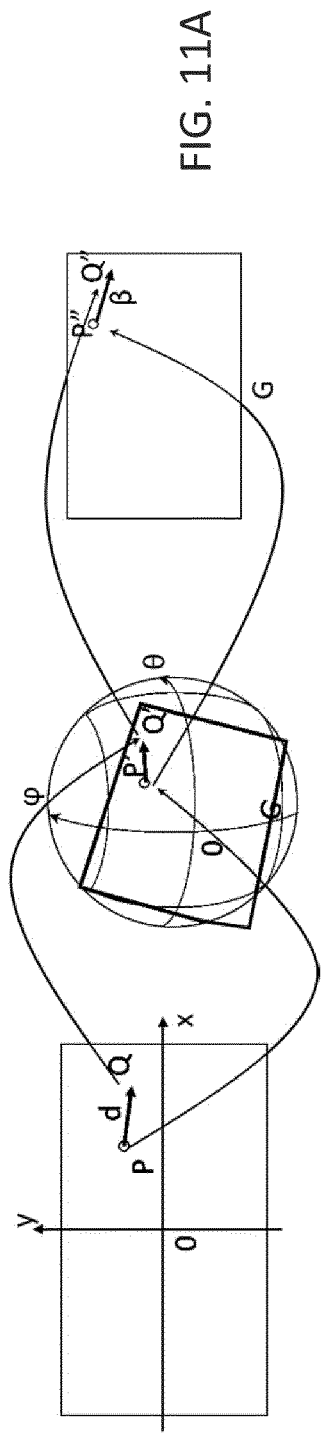
FIG. 11A
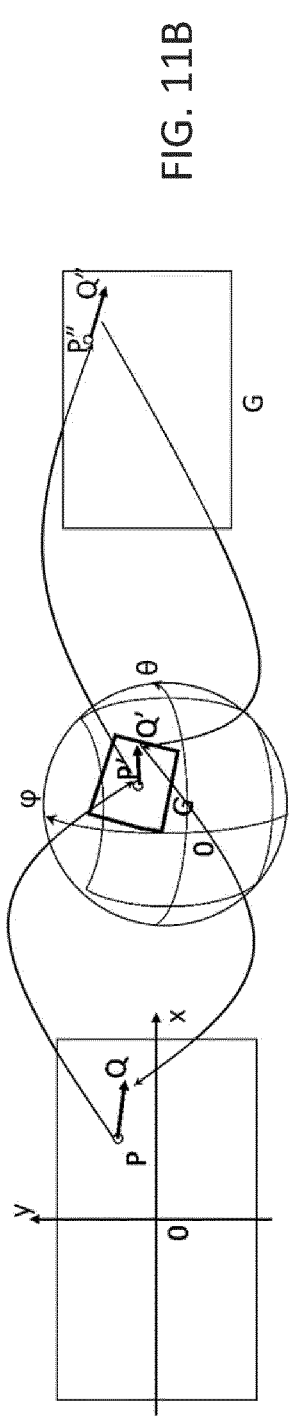
FIG. 11B

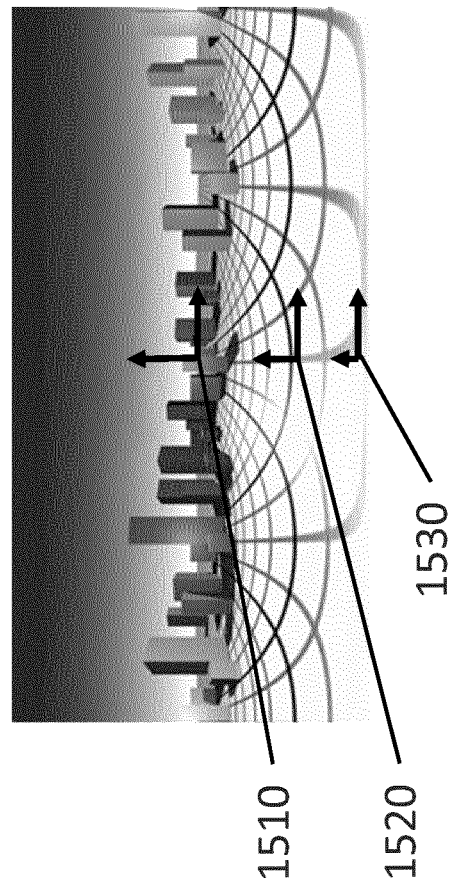
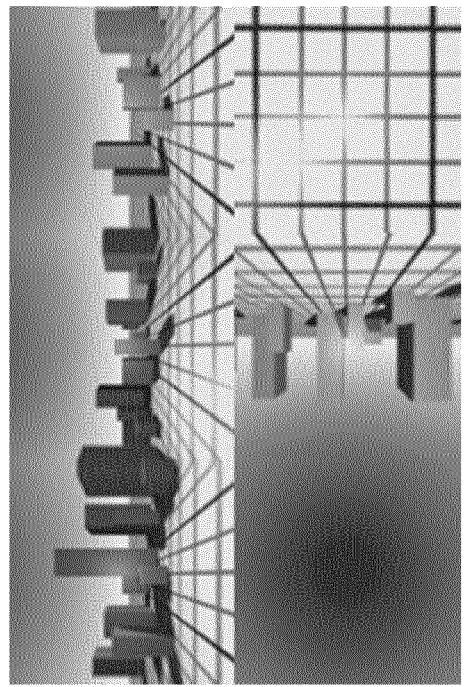
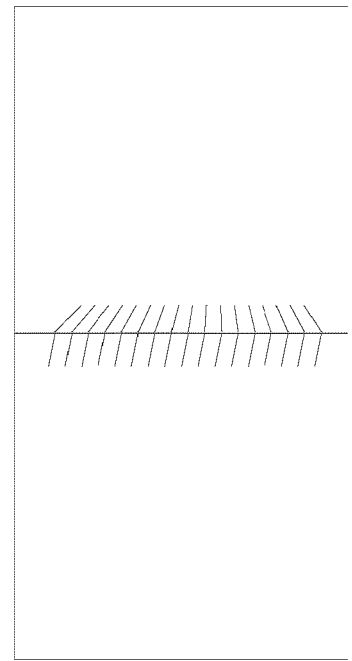
FIG. 14A
FIG. 14B
FIG. 15

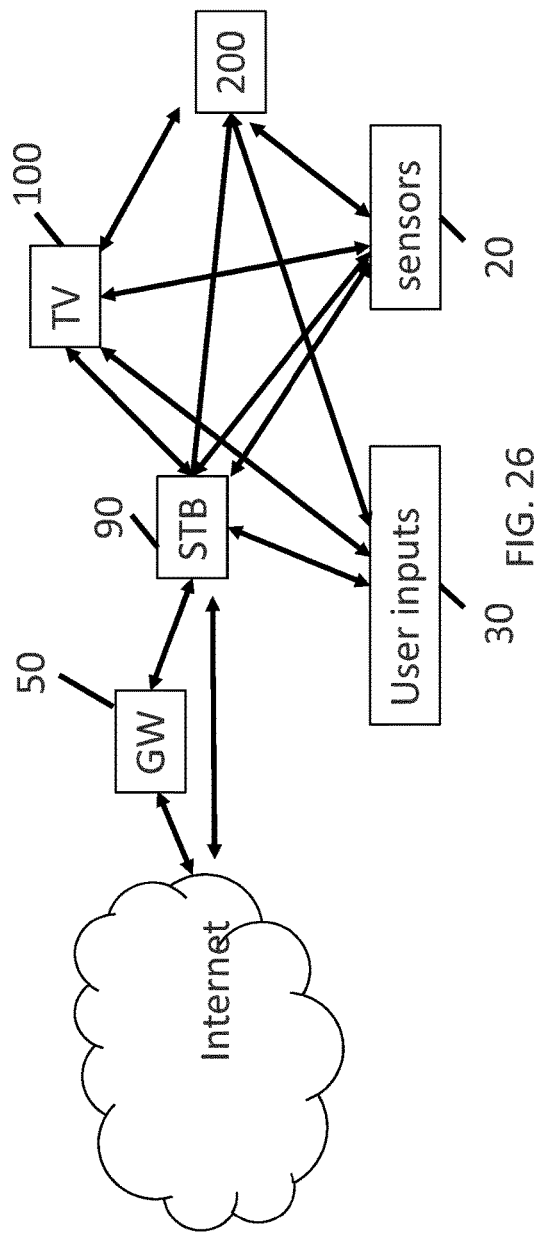
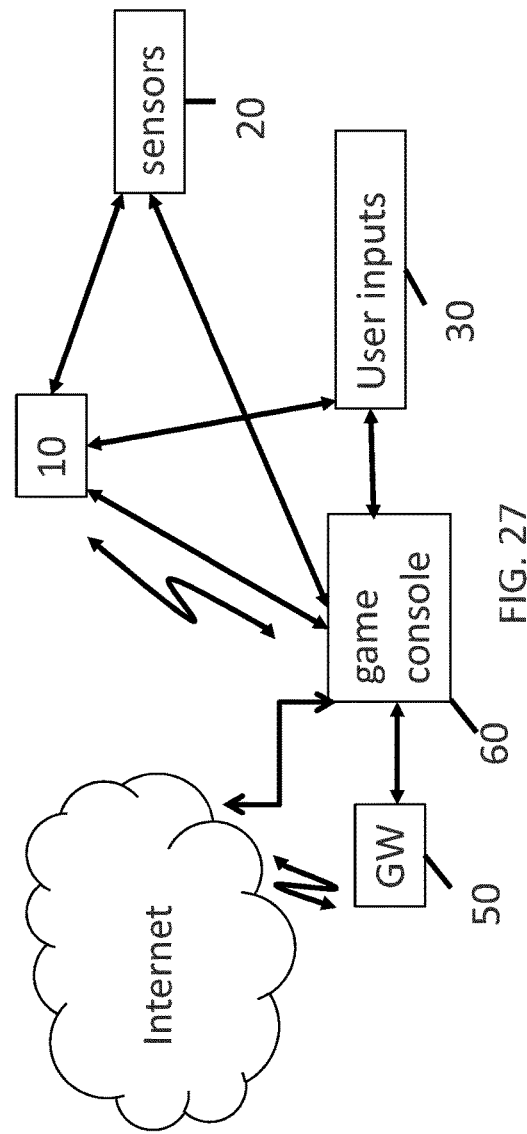

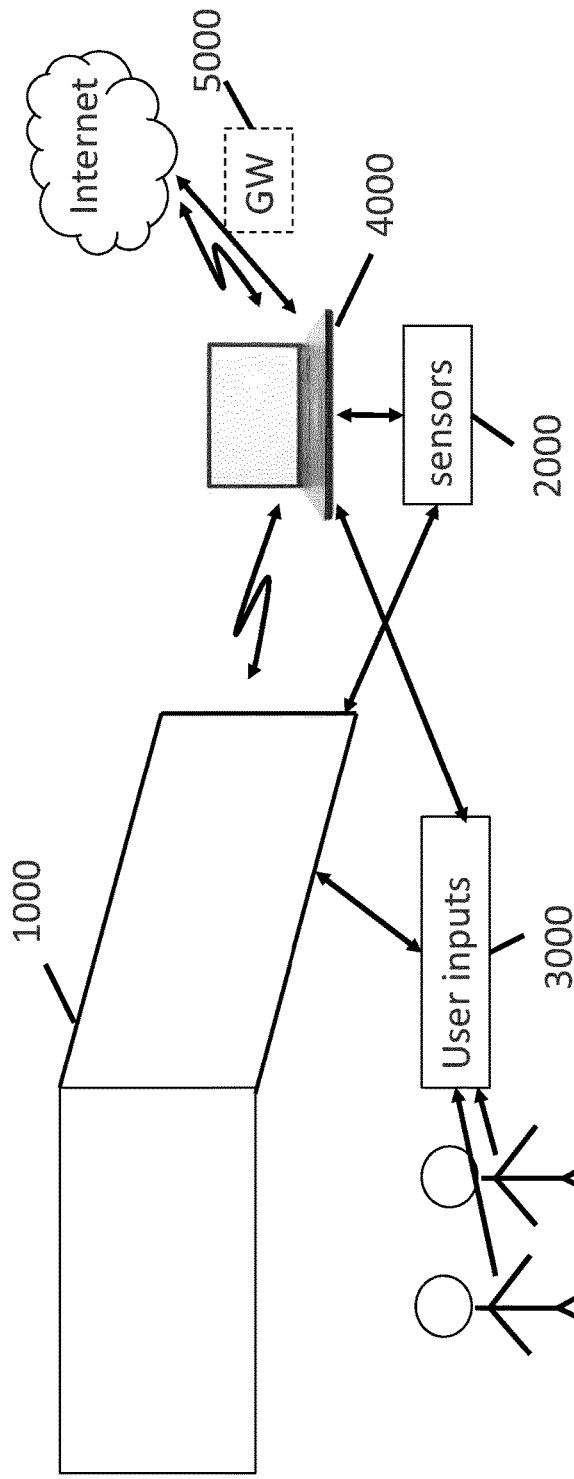
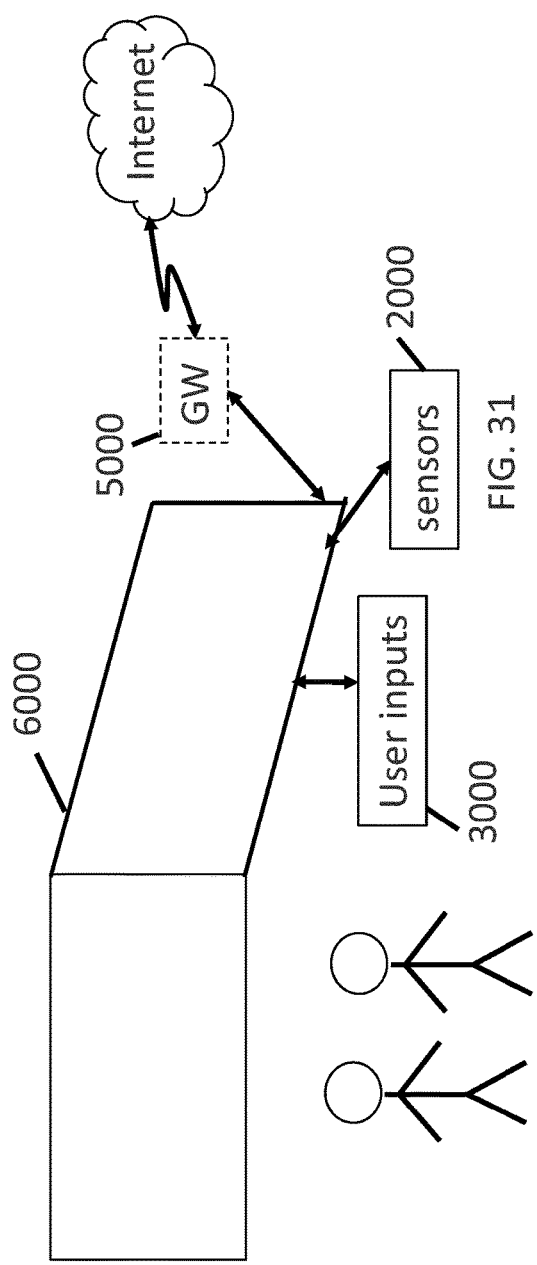
FIG. 30
FIG. 31

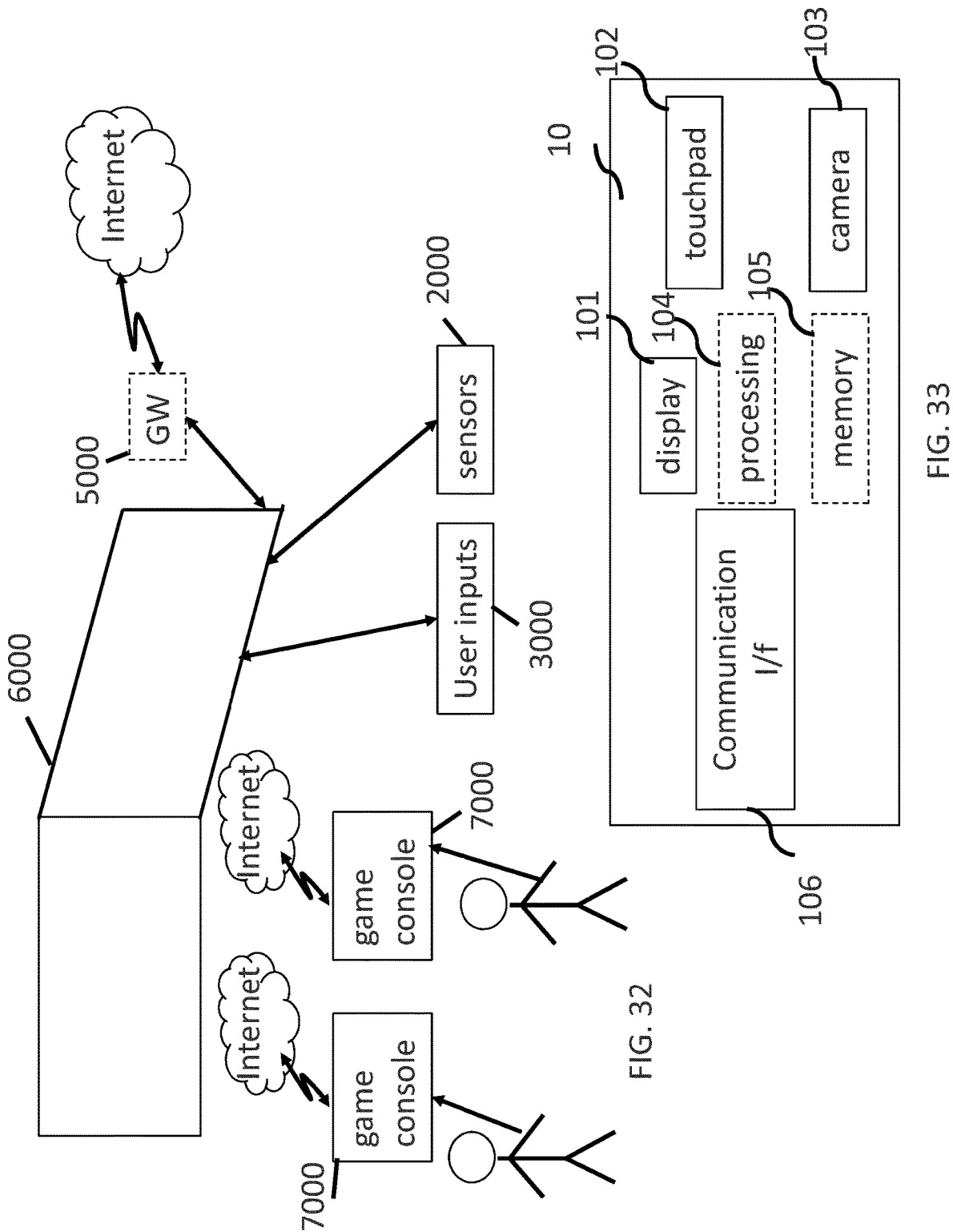

derived based on the first most
METHOD AND APPARATUS FOR OMNIDIRECTIONAL VIDEO CODING WITH ADAPTIVE INTRA MOST PROBABLE MODES This application claims the benefit, under 35 U.S.C. § 365 of International Application PCT/EP2017/074624, filed Sep. 28, 2017, which was published in accordance with PCT Article 21(2) on Apr. 5, 2018 in English and which claims the benefit of European patent application 16306271.4, filed Sep. 30, 2016

TECHNICAL FIELD

The present embodiments generally relate to a method and an apparatus for video encoding and decoding, and more particularly, to a method and an apparatus for video encoding and decoding with adaptive intra probable modes.

BACKGROUND

Recently there has been a growth of available large field-of-view content (up to 360°). Such content is potentially not fully visible by a user watching the content on immersive display devices such as Head Mounted Displays (HMD), smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

SUMMARY

According to a general aspect of the present principles, a method of encoding video data, comprising: accessing a block of a picture; determining an intra prediction mode from a set of available intra prediction modes for the block, wherein a number of the available intra prediction modes in the set is based on a location of the block; and encoding the block using the determined intra prediction mode.

According to another aspect of the present principles, a method of decoding video data, comprising: determining an intra prediction mode from a set of available intra prediction modes for a block of a picture, wherein a number of the available intra prediction modes in the set is based on a location for the block; and decoding the block using the determined intra prediction mode.

According to another aspect of the present principles, an apparatus for encoding video data, comprising at least one memory and one or more processors, wherein the one or more processors are configured to: access a block of a picture; determine an intra prediction mode from a set of available intra prediction modes for the block, wherein a number of the available intra prediction modes in the set is based on a location for the block; and encode the block using the determined intra prediction mode.

According to another aspect of the present principles, an apparatus for decoding video data, comprising at least one memory and one or more processors, wherein the one or more processors are configured to: determine an intra prediction mode from a set of available intra prediction modes for a block of a picture, wherein a number of the available intra prediction modes in the set is based on a location for the block; and decode the block using the determined intra prediction mode.

According to another aspect of the present principles, a bitstream is formatted to include: coded data representative of a block of a picture; coded data representative of an intra prediction mode from a set of available intra prediction modes for the block, wherein a number of the available intra prediction modes in the set is based on a location for the block, and wherein the block is encoded using the intra prediction mode.

The number of available intra prediction modes in the set may depend on a vertical position of the block. In one embodiment, the number of available intra prediction modes for the block is smaller than the number of available intra prediction modes for a second block, when the block is further away from the center of the picture in a vertical direction than the second block.

An angle difference between two adjacent intra prediction modes in the available intra prediction modes may be based on the location of the block.

According to an embodiment, a first most probable mode for the block can be derived based on an intra prediction mode of a neighboring block. Then a second most probable mode for the block may be derived based on the first most probable mode, wherein an angle difference between the first most probable mode and the second most probable mode is based on the location of the block. The intra prediction mode for the block may be selected to be one of the first most probable mode and the second probable mode.

If the intra prediction mode of the block is one of the most probable modes, then an MPM index is encoded for the block. Otherwise, the intra prediction mode of the block may be encoded using a fixed length code, wherein a length of the fixed length code is based on the number of available intra prediction modes in the set. When the number of available intra prediction modes in the set is based on the vertical position of the block, the length of the fixed length code depends on the vertical position of the block. The vertical position of a block may be decided as the position of a point on the block, for example, a center or a corner point of the block.

For a first block and a second block in a picture, wherein a first set of available intra prediction modes for the first block is different from a second set of available intra prediction modes for the second block, a first angle difference between two adjacent intra prediction modes in the first set of available intra prediction modes may be the same as a second angle difference between two adjacent intra prediction modes in the second set of available intra prediction modes.

For a first block and a second block in a picture, wherein a first set of available intra prediction modes for the first block is different from a second set of available intra prediction modes, the first set of available intra prediction modes for the first block may be represented by a first set of contiguous intra prediction mode indices, and the second set of available intra prediction modes for the second block may also be represented by a second set of contiguous intra prediction mode indices. In one embodiment, the same intra prediction mode index in the first set of available intra prediction modes and the second set of available intra prediction modes corresponds to the same intra prediction mode.

A look-up table may be used to associate the number of available intra prediction modes in the set for the block with the location of the block. Using a look-up table may simplify and speed up the above processes.

The number of available intra prediction modes in the set for the block may be indicated in a bitstream. Thus, the decoder can get the number of available intra prediction modes in the set for the block from the bitstream directly, without the need to compute the number at the decoder side.

The present embodiments also provide an apparatus for encoding or decoding video data according to the methods described above. The present embodiments also provide an apparatus for transmitting the bitstream generated according to the methods described above.

The present embodiments also provide a computer readable storage medium having stored thereon instructions for encoding or decoding video data according to the methods described above. The present embodiments also provide a computer readable storage medium having stored thereon a bitstream generated according to the methods described above.

BRIEF DESCRIPTION OF THE DRAWINGS

FIGS. 3A, 3B, 3C and 3D illustrate an exemplary inverse equi-rectangular mapping.

FIG. 4A shows that a point is projected from the 3D surface to the rendered frame G, and FIG. 4B shows an approximated of the projection.

FIG. 10A shows a normalized 2D frame in the x-y coordinate system, and FIG. 10B shows an exemplary warping index deduction for equi-rectangular mapping.

FIG. 11A illustrates an exemplary workflow for computing the conversion "T," according to an embodiment of the present principles, and FIG. 11B illustrates an exemplary workflow for computing the conversion "T," according to an embodiment of the present principles.

FIG. 14A shows an example of cube mapping, and FIG. 14B shows an example of direction change at an edge.

FIG. 15 shows an exemplary equi-rectangular layout of an omnidirectional picture and the evolution of the local frame of reference along the vertical coordinate.

FIG. 26 represents a first embodiment of a system, according to a particular embodiment of the present principles.

FIG. 27 represents a first embodiment of a system, according to a particular embodiment of the present principles.

FIG. 30 represents a first embodiment of a system, according to a particular embodiment of the present principles.

FIG. 31 represents a first embodiment of a system according to the present principles.

FIG. 32 represents a first embodiment of a system according to the present principles.

FIG. 33 represents a first embodiment of an immersive video rendering device according to the present principles.

DETAILED DESCRIPTION

A large field-of-view content may be, among others, a three-dimension computer graphic imagery scene (3D CGI scene), a point cloud or an immersive video. Many terms might be used to design such immersive videos such as for example virtual Reality (VR), 360, panoramic, 4π, steradians, immersive, omnidirectional, large field of view.

An immersive video typically refers to a video encoded on a rectangular frame that is a two-dimension array of pixels (i.e., element of color information) like a "regular" video. In many implementations, the following processes may be performed. To be rendered, the frame is, first, mapped on the inner face of a convex volume, also called mapping surface (e.g., a sphere, a cube, a pyramid), and, second, a part of this volume is captured by a virtual camera. Images captured by the virtual camera are rendered on the screen of the immersive display device. A stereoscopic video is encoded on one or two rectangular frames, projected on two mapping surfaces which are combined to be captured by two virtual cameras according to the characteristics of the device.

Pixels may be encoded according to a mapping function in the frame. The mapping function may depend on the mapping surface. For a same mapping surface, several mapping functions are possible. For example, the faces of a cube may be structured according to different layouts within the frame surface. A sphere may be mapped according to an equirectangular projection or to a gnomonic projection for example. The organization of pixels resulting from the selected projection function modifies or breaks lines continuities, orthonormal local frame, pixel densities and introduces periodicity in time and space. These are typical features that are used to encode and decode videos. Existing encoding and decoding methods usually do not take specificities of immersive videos into account. Indeed, as immersive videos can be 360° videos, a panning, for example, introduces motion and discontinuities that require a large amount of data to be encoded while the content of the scene does not change. Taking immersive videos specificities into account while encoding and decoding video frames would bring valuable advantages to the encoding or decoding methods.

Figure 1:
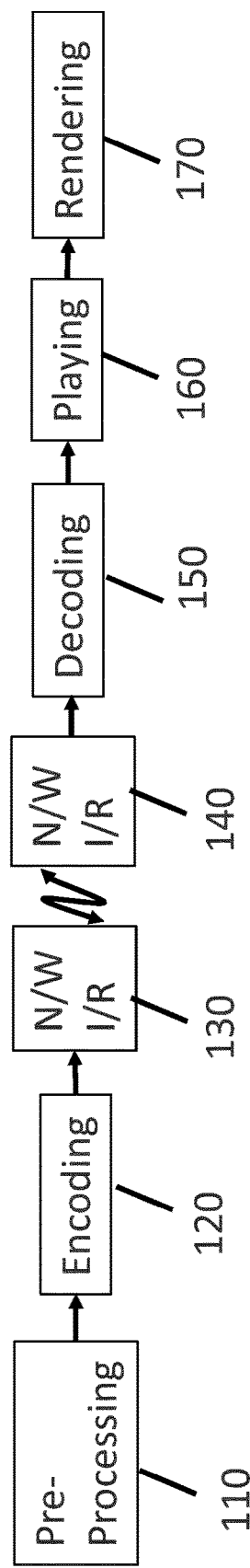
FIG. 1 illustrates an exemplary system for encoding and decoding omnidirectional videos, according to an embodiment of the present principles.

FIG. 1 illustrates a general overview of an encoding and decoding system according to an example embodiment. The system of FIG. 1 is a functional system. A pre-processing module 110 may prepare the content for encoding by the encoding device 120. The pre-processing module 110 may perform multi-image acquisition, merging of the acquired multiple images in a common space (typically a 3D sphere if we encode the directions), and mapping of the 3D sphere into a 2D frame using, for example, but not limited to, an equirectangular mapping or a cube mapping. The pre-processing module 110 may also accept an omnidirectional video in a particular format (for example, equirectangular) as input, and pre-processes the video to change the mapping into a format more suitable for encoding. Depending on the acquired video data representation, the pre-processing module 110 may perform a mapping space change.

The encoding device 120 and the encoding method will be described with respect to other figures of the specification. After being encoded, the data, which may encode immersive video data or 3D CGI encoded data for instance, are sent to a network interface 130, which can be typically implemented in any network interface, for instance present in a gateway. The data are then transmitted through a communication network, such as internet but any other network can be foreseen. Then the data are received via network interface 140. Network interface 140 can be implemented in a gateway, in a television, in a set-top box, in a head mounted display device, in an immersive (projective) wall or in any immersive video rendering device.

After reception, the data are sent to a decoding device 150. Decoding function is one of the processing functions described in the following FIGS. 2 to 12. Decoded data are then processed by a player 160. Player 160 prepares the data for the rendering device 170 and may receive external data from sensors or users input data. More precisely, the player 160 prepares the part of the video content that is going to be displayed by the rendering device 170. The decoding device 150 and the player 160 may be integrated in a single device (e.g., a smartphone, a game console, a STB, a tablet, a computer, etc.). In other embodiments, the player 160 may be integrated in the rendering device 170.

Several types of systems may be envisioned to perform the decoding, playing and rendering functions of an immersive display device, for example when rendering an immersive video.

A first system, for processing augmented reality, virtual reality, or augmented virtuality content is illustrated in FIGS. 2 to 6. Such a system comprises processing functions, an immersive video rendering device which may be a head mounted display (HMD), a tablet or a smartphone for example and may comprise sensors. The immersive video rendering device may also comprise additional interface modules between the display device and the processing functions. The processing functions can be performed by one or several devices. They can be integrated into the immersive video rendering device or they can be integrated into one or several processing devices. The processing device comprises one or several processors and a communication interface with the immersive video rendering device, such as a wireless or wired communication interface.

The processing device can also comprise a second communication interface with a wide access network such as internet and access content located on a cloud, directly or through a network device such as a home or a local gateway. The processing device can also access a local storage through a third interface such as a local access network interface of Ethernet type.

In an embodiment, the processing device may be a computer system having one or several processing units. In another embodiment, it may be a smartphone which can be connected through wired or wireless links to the immersive video rendering device or which can be inserted in a housing in the immersive video rendering device and communicating with it through a connector or wirelessly as well. Communication interfaces of the processing device are wireline interfaces (for example a bus interface, a wide area network interface, a local area network interface) or wireless interfaces (such as a IEEE 802.11 interface or a Bluetooth® interface).

When the processing functions are performed by the immersive video rendering device, the immersive video rendering device can be provided with an interface to a network directly or through a gateway to receive and/or transmit content.

In another embodiment, the system comprises an auxiliary device which communicates with the immersive video rendering device and with the processing device. In such an embodiment, this auxiliary device can contain at least one of the processing functions.

The immersive video rendering device may comprise one or several displays. The device may employ optics such as lenses in front of each of its display. The display can also be a part of the immersive display device like in the case of smartphones or tablets. In another embodiment, displays and optics may be embedded in a helmet, in glasses, or in a visor that a user can wear. The immersive video rendering device may also integrate several sensors, as described later on. The immersive video rendering device can also comprise several interfaces or connectors. It might comprise one or several wireless modules in order to communicate with sensors, processing functions, handheld or other body parts related devices or sensors.

The immersive video rendering device can also comprise processing functions executed by one or several processors and configured to decode content or to process content. By processing content here, it is understood all functions to prepare a content that can be displayed. This may comprise, for instance, decoding a content, merging content before displaying it and modifying the content to fit with the display device.

One function of an immersive content rendering device is to control a virtual camera which captures at least a part of the content structured as a virtual volume. The system may comprise pose tracking sensors which totally or partially track the user's pose, for example, the pose of the user's head, in order to process the pose of the virtual camera. Some positioning sensors may track the displacement of the user. The system may also comprise other sensors related to environment for example to measure lighting, temperature or sound conditions. Such sensors may also be related to the users' bodies, for instance, to measure sweating or heart rate. Information acquired through these sensors may be used to process the content. The system may also comprise user input devices (e.g., a mouse, a keyboard, a remote control, a joystick). Information from user input devices may be used to process the content, manage user interfaces or to control the pose of the virtual camera. Sensors and user input devices communicate with the processing device and/or with the immersive rendering device through wired or wireless communication interfaces.

Using FIGS. 25 to 29, several embodiments are described of this first type of system for displaying augmented reality, virtual reality, augmented virtuality or any content from augmented reality to virtual reality.

Figure 25:
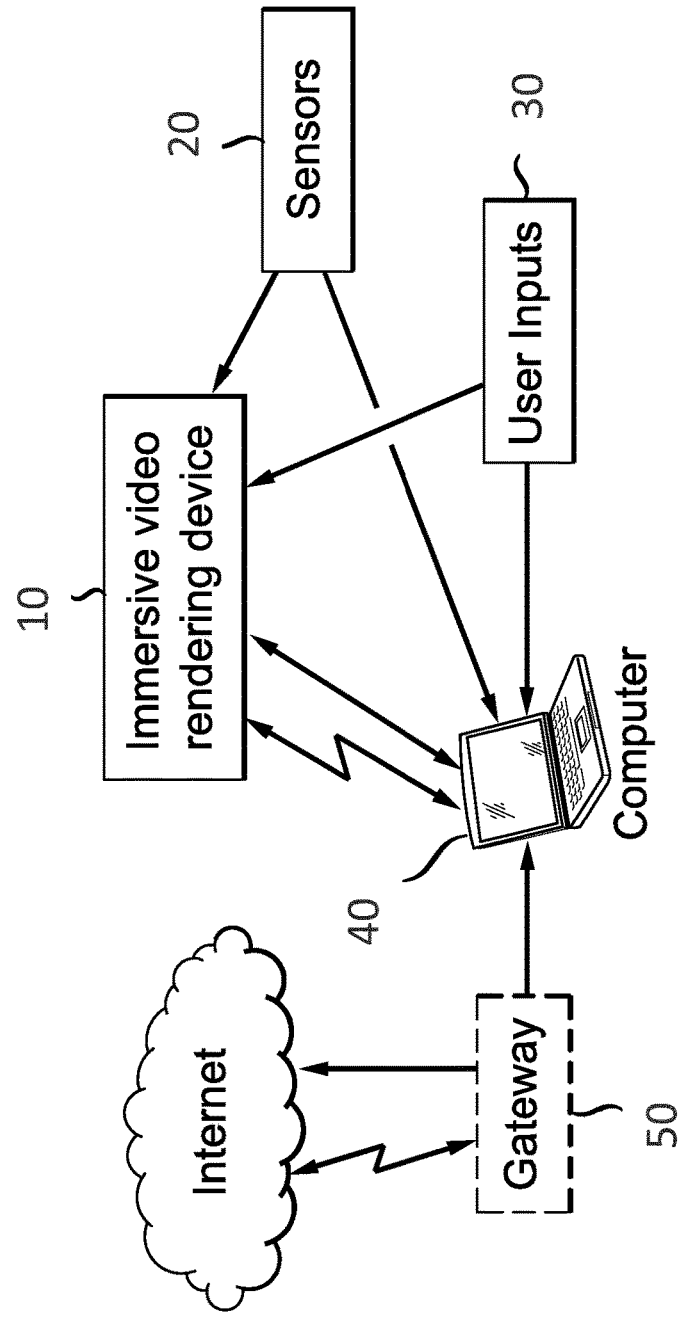
FIG. 25 represents a first embodiment of a system, according to a particular embodiment of the present principles.

FIG. 25 illustrates a particular embodiment of a system configured to decode, process and render immersive videos. The system comprises an immersive video rendering device 10, sensors 20, user inputs devices 30, a computer 40 and a gateway 50 (optional).

The immersive video rendering device 10, illustrated in FIG. 33, comprises a display 101. The display is, for example of OLED or LCD type. The immersive video rendering device 10 is, for instance a HMD, a tablet or a smartphone. The device 10 may comprise a touch surface 102 (e.g., a touchpad or a tactile screen), a camera 103, a memory 105 in connection with at least one processor 104 and at least one communication interface 106. The at least one processor 104 processes the signals received from the sensors 20.

Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement. Data from sensors 20 and user input devices 30 can also be transmitted to the computer 40 which will process the data according to the input of these sensors.

Memory 105 includes parameters and code program instructions for the processor 104. Memory 105 can also comprise parameters received from the sensors 20 and user input devices 30. Communication interface 106 enables the immersive video rendering device to communicate with the computer 40. The communication interface 106 of the processing device may be wireline interfaces (for example a bus interface, a wide area network interface, a local area network interface) or wireless interfaces (such as a IEEE 802.11 interface or a Bluetooth® interface).

Computer 40 sends data and optionally control commands to the immersive video rendering device 10. The computer 40 is in charge of processing the data, i.e., prepare them for display by the immersive video rendering device 10. Processing can be done exclusively by the computer 40 or part of the processing can be done by the computer and part by the immersive video rendering device 10. The computer 40 is connected to internet, either directly or through a gateway or network interface 50. The computer 40 receives data representative of an immersive video from the internet, processes these data (e.g., decodes them and possibly prepares the part of the video content that is going to be displayed by the immersive video rendering device 10) and sends the processed data to the immersive video rendering device 10 for display. In another embodiment, the system may also comprise local storage (not represented) where the data representative of an immersive video are stored, said local storage can be on the computer 40 or on a local server accessible through a local area network for instance (not represented).

FIG. 26 represents a second embodiment. In this embodiment, a STB 90 is connected to a network such as internet directly (i.e., the STB 90 comprises a network interface) or via a gateway 50. The STB 90 is connected through a wireless interface or through a wired interface to rendering devices such as a television set 100 or an immersive video rendering device 200. In addition to classic functions of a STB, STB 90 comprises processing functions to process video content for rendering on the television 100 or on any immersive video rendering device 200. These processing functions are the same as the ones that are described for computer 40 and are not described again here. Sensors 20 and user input devices 30 are also of the same type as the ones described earlier with regards to FIG. 25. The STB 90 obtains the data representative of the immersive video from the internet. In another embodiment, the STB 90 obtains the data representative of the immersive video from a local storage (not represented) where the data representative of the immersive video are stored.

FIG. 27 represents a third embodiment related to the one represented in FIG. 25. The game console 60 processes the content data. Game console 60 sends data and optionally control commands to the immersive video rendering device 10. The game console 60 is configured to process data representative of an immersive video and to send the processed data to the immersive video rendering device 10 for display. Processing can be done exclusively by the game console 60 or part of the processing can be done by the immersive video rendering device 10.

The game console 60 is connected to internet, either directly or through a gateway or network interface 50. The game console 60 obtains the data representative of the immersive video from the internet. In another embodiment, the game console 60 obtains the data representative of the immersive video from a local storage (not represented) where the data representative of the immersive video are stored, said local storage can be on the game console 60 or on a local server accessible through a local area network for instance (not represented).

The game console 60 receives data representative of an immersive video from the internet, processes these data (e.g., decodes them and possibly prepares the part of the video that is going to be displayed) and sends the processed data to the immersive video rendering device 10 for display. The game console 60 may receive data from sensors 20 and user input devices 30 and may use them to process the data representative of an immersive video obtained from the internet or from the from the local storage.

Figure 28:
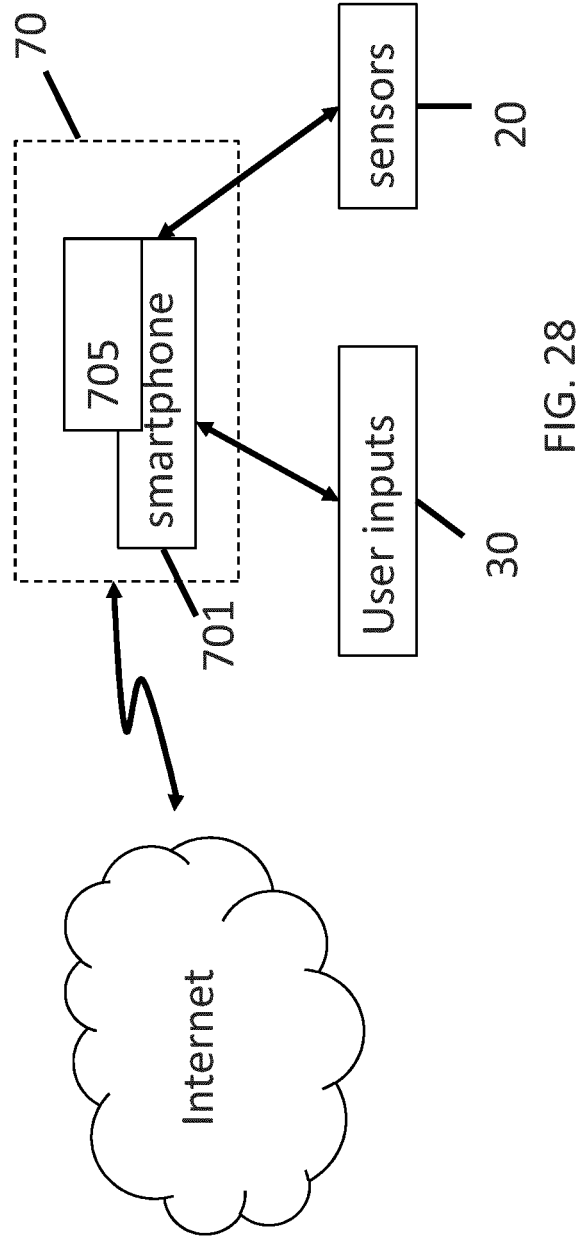
FIG. 28 represents a first embodiment of a system, according to a particular embodiment of the present principles.

FIG. 28 represents a fourth embodiment of said first type of system where the immersive video rendering device 70 is formed by a smartphone 701 inserted in a housing 705. The smartphone 701 may be connected to internet and thus may obtain data representative of an immersive video from the internet. In another embodiment, the smartphone 701 obtains data representative of an immersive video from a local storage (not represented) where the data representative of an immersive video are stored, said local storage can be on the smartphone 701 or on a local server accessible through a local area network for instance (not represented).

Figure 34:
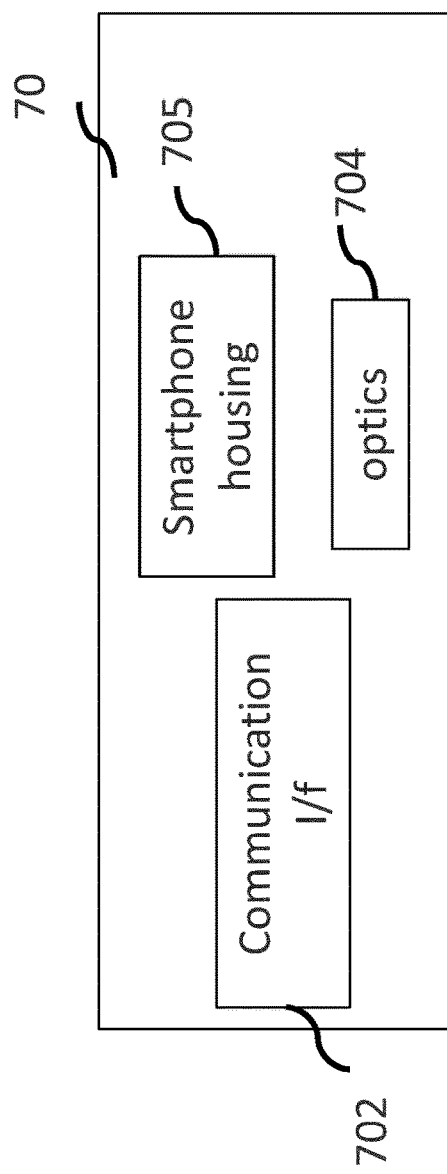
FIG. 34 represents a first embodiment of an immersive video rendering device according to the present principles.

Immersive video rendering device 70 is described with reference to FIG. 34 which gives a preferred embodiment of immersive video rendering device 70. It optionally comprises at least one network interface 702 and the housing 705 for the smartphone 701. The smartphone 701 comprises all functions of a smartphone and a display. The display of the smartphone is used as the immersive video rendering device 70 display. Therefore no display other than the one of the smartphone 701 is included. However, optics 704, such as lenses, are included for seeing the data on the smartphone display. The smartphone 701 is configured to process (e.g., decode and prepare for display) data representative of an immersive video possibly according to data received from the sensors 20 and from user input devices 30. Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement.

Figure 29:
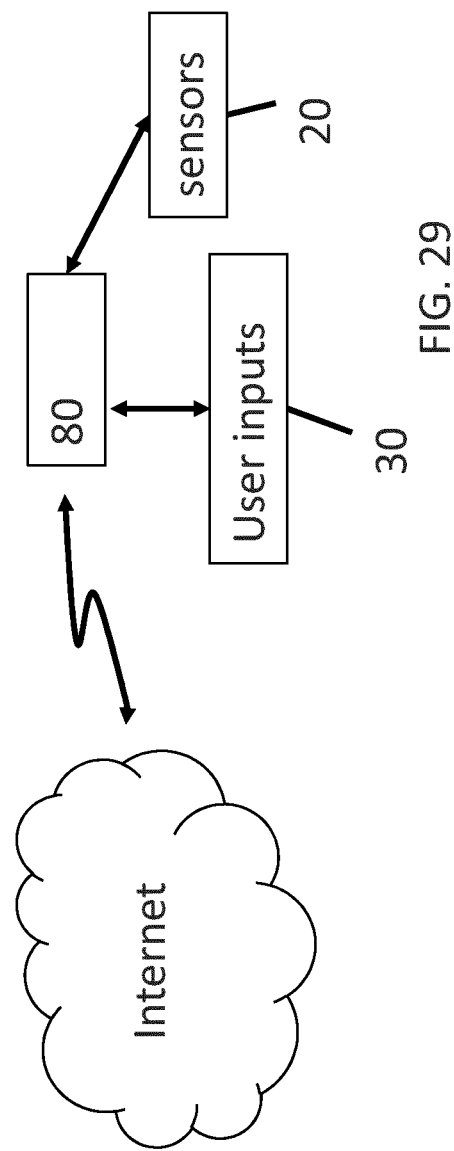
FIG. 29 represents a first embodiment of a system, according to a particular embodiment of the present principles.

FIG. 29 represents a fifth embodiment of said first type of system in which the immersive video rendering device 80 comprises all functionalities for processing and displaying the data content. The system comprises an immersive video rendering device 80, sensors 20 and user input devices 30. The immersive video rendering device 80 is configured to process (e.g., decode and prepare for display) data representative of an immersive video possibly according to data received from the sensors 20 and from the user input devices 30. The immersive video rendering device 80 may be connected to internet and thus may obtain data representative of an immersive video from the internet. In another embodiment, the immersive video rendering device 80 obtains data representative of an immersive video from a local storage (not represented) where the data representative of an immersive video are stored, said local storage can be on the rendering device 80 or on a local server accessible through a local area network for instance (not represented).

Figure 35:
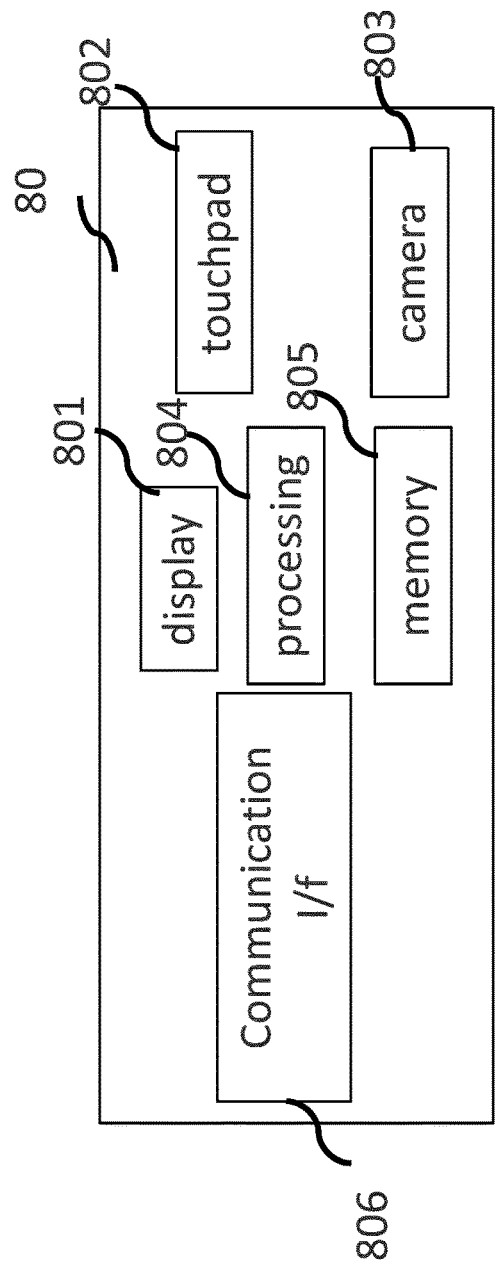
FIG. 35 represents a first embodiment of an immersive video rendering device according to the present principles.

The immersive video rendering device 80 is illustrated in FIG. 35. The immersive video rendering device comprises a display 801. The display can be for example of OLED or LCD type, a touchpad (optional) 802, a camera (optional) 803, a memory 805 in connection with at least one processor 804 and at least one communication interface 806. Memory 805 comprises parameters and code program instructions for the processor 804. Memory 805 can also comprise parameters received from the sensors 20 and user input devices 30. Memory can also be large enough to store the data representative of the immersive video content. For this several types of memories can exist and memory 805 can be a single memory or can be several types of storage (SD card, hard disk, volatile or non-volatile memory . . . ) Communication interface 806 enables the immersive video rendering device to communicate with internet network. The processor 804 processes data representative of the video in order to display them of display 801. The camera 803 captures images of the environment for an image processing step. Data are extracted from this step in order to control the immersive video rendering device.

A second system, for processing augmented reality, virtual reality, or augmented virtuality content is illustrated in FIGS. 30 to 32. Such a system comprises an immersive wall.

FIG. 30 represents a system of the second type. It comprises a display 1000 which is an immersive (projective) wall which receives data from a computer 4000. The computer 4000 may receive immersive video data from the internet. The computer 4000 is usually connected to internet, either directly or through a gateway 5000 or network interface. In another embodiment, the immersive video data are obtained by the computer 4000 from a local storage (not represented) where the data representative of an immersive video are stored, said local storage can be in the computer 4000 or in a local server accessible through a local area network for instance (not represented).

This system may also comprise sensors 2000 and user input devices 3000. The immersive wall 1000 can be of OLED or LCD type. It can be equipped with one or several cameras. The immersive wall 1000 may process data received from the sensor 2000 (or the plurality of sensors 2000). The data received from the sensors 2000 may be related to lighting conditions, temperature, environment of the user, e.g., position of objects.

The immersive wall 1000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

Sensors 2000 and user input devices 3000 data may also be transmitted to the computer 4000. The computer 4000 may process the video data (e.g., decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection.

Computer 4000 sends the processed data and optionally control commands to the immersive wall 1000. The computer 4000 is configured to process the data, i.e., preparing them for display, to be displayed by the immersive wall 1000. Processing can be done exclusively by the computer 4000 or part of the processing can be done by the computer 4000 and part by the immersive wall 1000.

FIG. 31 represents another system of the second type. It comprises an immersive (projective) wall 6000 which is configured to process (e.g., decode and prepare data for display) and display the video content. It further comprises sensors 2000, user input devices 3000.

The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

This system may also comprise sensors 2000 and user input devices 3000. The immersive wall 6000 can be of OLED or LCD type. It can be equipped with one or several cameras. The immersive wall 6000 may process data received from the sensor 2000 (or the plurality of sensors 2000). The data received from the sensors 2000 may be related to lighting conditions, temperature, environment of the user, e.g., position of objects.

The immersive wall 6000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

The immersive wall 6000 may process the video data (e.g., decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection. The immersive wall 6000 may comprise at least one communication interface to communicate with the sensors and with internet.

FIG. 32 illustrates a third embodiment where the immersive wall is used for gaming. One or several gaming consoles 7000 are connected, preferably through a wireless interface to the immersive wall 6000. The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

Gaming console 7000 sends instructions and user input parameters to the immersive wall 6000. Immersive wall 6000 processes the immersive video content possibly according to input data received from sensors 2000 and user input devices 3000 and gaming consoles 7000 in order to prepare the content for display. The immersive wall 6000 may also comprise internal memory to store the content to be displayed.

Figure 2A:
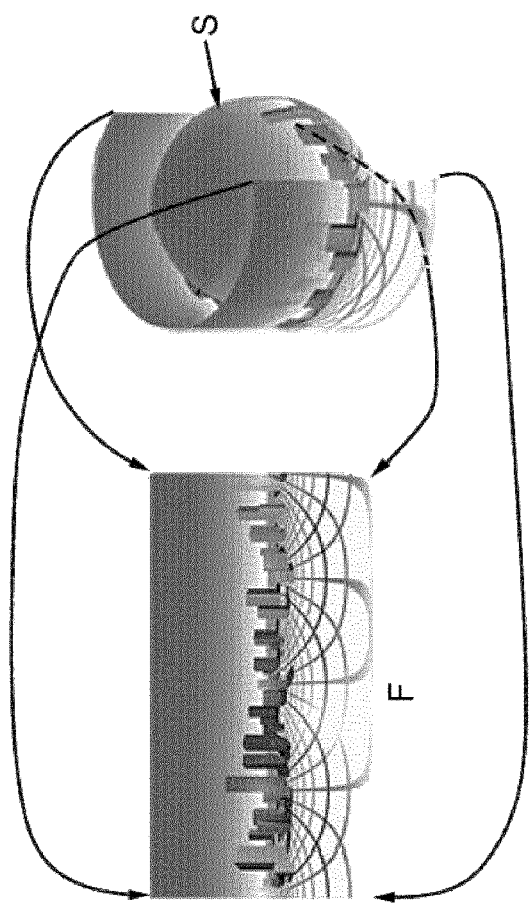
FIG. 2A shows that an exemplary sphere surface S is mapped to a 2D frame F using an equi-rectangular projection.
Figure 2C:
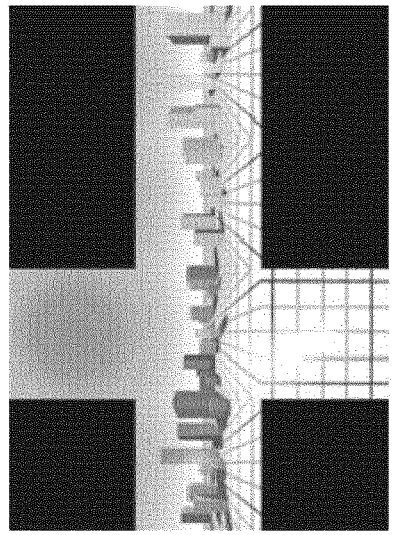
FIG. 2B shows that an exemplary cube surface is mapped to a 2D frame as shown in FIG. 2C using a cube mapping.
Figure 2B:
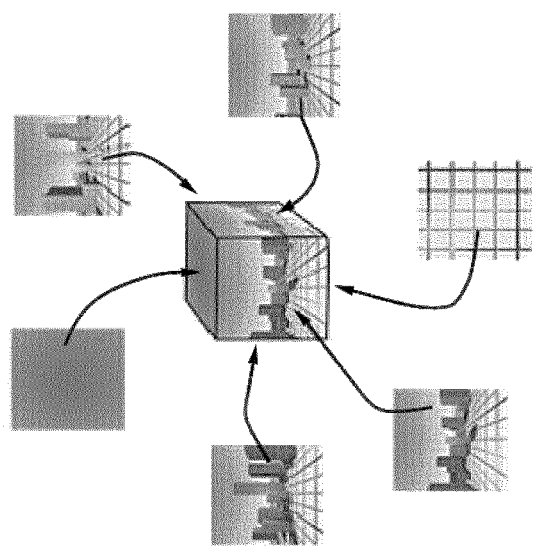

In one embodiment, we consider that the omnidirectional video is represented in a format that enables the projection of the surrounding 3D surface S onto a standard rectangular frame F that is represented in a format suitable for a video codec. Various projections can be used to project 3D surfaces to 2D surfaces. For example, FIG. 2A shows that an exemplary sphere surface S is mapped to a 2D frame F using an equi-rectangular projection, and FIG. 2B shows that an exemplary cube surface is mapped to a 2D frame as shown in FIG. 2C using a cube mapping. Other mappings, such as pyramidal, icosahedral or octahedral mapping, can map a 3D surface into a 2D frame.

The 2D frame F can then be encoded using existing video encoders, for example, encoders compliant with VP9, VP10, MPEG-2, H.264/AVC, or H.265/HEVC. The 2D frame F can also be encoded with an encoder adaptive to the properties of omnidirectional videos, for example, using an adjusted VP9, VP10, MPEG-2, H.264/AVC, or H.265/HEVC encoder. After encoding and decoding, the decoded 2D frame can be mapped back to the corresponding 3D surface, for example, a sphere for an equi-rectangular mapping or a cube for cube mapping. The 3D surface can then be projected onto a "virtual screen" corresponding to a user's viewpoint in order to obtain the final rendered frame. The steps of decoding the 2D frame and projecting from the 3D surface to a rendered frame can be merged into a single step, where a part of the decoded frame is mapped onto the rendered frame.

For simplicity of notation, we may refer to the decoded 2D frame also as "F," and the 3D surface used in rendering also as S. It should be understood that the 2D frame to be encoded and the 2D frame to be decoded may be different due to video compression, and the 3D surface in pre-processing and the 3D surface in rendering may also be different. In the present application, we use the terms "mapping" and "projection" interchangeably, use the terms "pixel" and "sample" interchangeably, and use the terms "frame" and "picture" interchangeably.

Equi-Rectangular Mapping

FIG. 3 illustrates an exemplary inverse equi-rectangular mapping, where a 2D frame is mapped to a rendered frame. FIG. 3A shows a point P in an x-y coordinate system in the decoded frame (also referred to as an "equi-rectangular frame"). FIG. 3B shows a point P' mapped from P onto the 2D surface of rendering, using θ-φ polar coordinates. FIG. 3C shows point $P^{3d}$ corresponding to P' in the 3D rendering space S, using Cartesian coordinates. FIG. 3D shows point P''', resulting from $P^{3d}$ projected onto the local plane tangent to the surface at $P^{3d}$, in a local rendered frame G. By construction P''' is at the center of the frame. The local rendered frame G corresponds to a portion of the 2D frame F, often based on what the user wants to see, for example, based on what the HMD or the user's handheld device points at. The local rendered frame G is also referred to as a local rendered version.

The mappings from P to P', from P' to $P^{3d}$, and from $P^{3d}$ to P''' are denoted as "f," "3d," and "proj," respectively. In FIG. 3, the inverse equi-rectangular mapping is shown in multiple steps ("f," "3d," and "proj") for illustration purposes. The inverse equi-rectangular mapping can be performed in fewer steps, for example, by combining "f," "3d," and "proj" into one or two steps.

Mathematically, the mappings "f" can be represented as:

$$f: M(x,y) \rightarrow M'(\theta,\varphi), \theta=2\pi x, \varphi=\pi y \qquad (1)$$

when a pixel M(x, y) in the frame F is mapped onto the 2D parametric surface at point M'(θ, φ), assuming normalized coordinates. With non-normalized coordinates:

$$\theta = \frac{2\pi\left(x - \frac{w}{2}\right)}{w}, \varphi = \frac{\pi\left(\frac{h}{2} - y\right)}{h}. \qquad (2)$$

The mapping "3d" from a point M'(θ, φ) onto the 3D surface of coordinate $M^{3d}$ can be represented as:

$$3d: M' \to M^{3d}, M^{3d} = \begin{bmatrix} \sin(\varphi - \frac{\pi}{2})\cos(\theta) \\ \sin(\varphi - \frac{\pi}{2})\sin(\theta) \\ \cos(\varphi - \frac{\pi}{2}) \end{bmatrix} \quad (3)$$

In order to go back to the frame F from a point $M^{3d}$, we compute the inverse transform $T^{-1}$:

$$T^{-1}: M^{3d} \to M, M = f^{-1}(3d^{-1}(M^{3d})) \quad (4)$$

From a point $M^{3d}$ (X, Y, Z) on 3D surface S, we can go back to the 2D parametric frame using the standard Cartesian to polar transformation:

$$3d^{-1}: M^{3d} \to M', \theta = \operatorname{atan}\left(\frac{Y}{X}\right) + \pi, \quad (5)$$

$$\varphi = -\operatorname{atan}\left(\frac{\sqrt{X^2 + Y^2}}{Z}\right) + \frac{\pi}{2}$$

To further go back to the 2D frame F, we can use:

$$f^{-1}: M'(\theta, \varphi) \to M(x, y) \quad (6)$$

For singular points (typically, at the poles), when x and y are close to 0, we may directly set:

$$\theta = 0, \varphi = \operatorname{sign}(Z)\frac{\pi}{2}. \quad (7)$$

It should be noted that special care should be taken for modular cases.

FIG. 4A shows that a point is projected ("proj") from the 3D surface to the rendered frame G. If a point Q' viewed from the local rendered frame in G is close to P', the plane tangent to the surface S can be approximated by the surface itself. In FIG. 4B, we show that Q" can be approximated by image of Q on the surface Q'.

The projection from a 3D space to a 2D surface often introduces some effects or alterations that may be challenging for encoding the resulting video at a quality/bitrate trade-off similar to those obtained for conventional planar ones. Those effects or alterations might include:
  Strong geometry distortions:
    straight lines are not straight anymore,
    orthonormal coordinate system are not orthonormal anymore
  Non-uniform pixel density: a pixel in the frame to be encoded does not always represent the same size on the surface to be encoded (i.e. the same size on the image during the rendering phase)
  Strong discontinuities: the frame layout may introduce strong discontinuities between two adjacent pixels
  Some periodicity may occur in the frame (for example from one border to the opposite one)

TABLE 1 lists some alterations for different mappings:

TABLE 1

| Mapping type | Equi-rectangular | Cube mapping | Pyramidal |
|---|---|---|---|
| 3D surface | Sphere | Cube | Pyramid |
| Straight lines | Continuously distorted | Piece-wise straight | Piece-wise straight |
| Orthonormal local frame | No | Yes, except on face boundaries | No, except on square face |
| Pixel density | Non-uniform (higher on equator line) | Almost constant | Non-uniform, except on square face |
| Discontinuities | No | Yes, on face boundaries | Yes, on face boundaries |
| Continuities | Yes, horizontal | Yes, between some faces | Yes, between some faces |

In the following, we mainly use an HEVC encoder and decoder to illustrate the encoding and decoding of omnidirectional videos. It should be noted that the present principles can be applied to other encoders or decoders.

Figure 5:
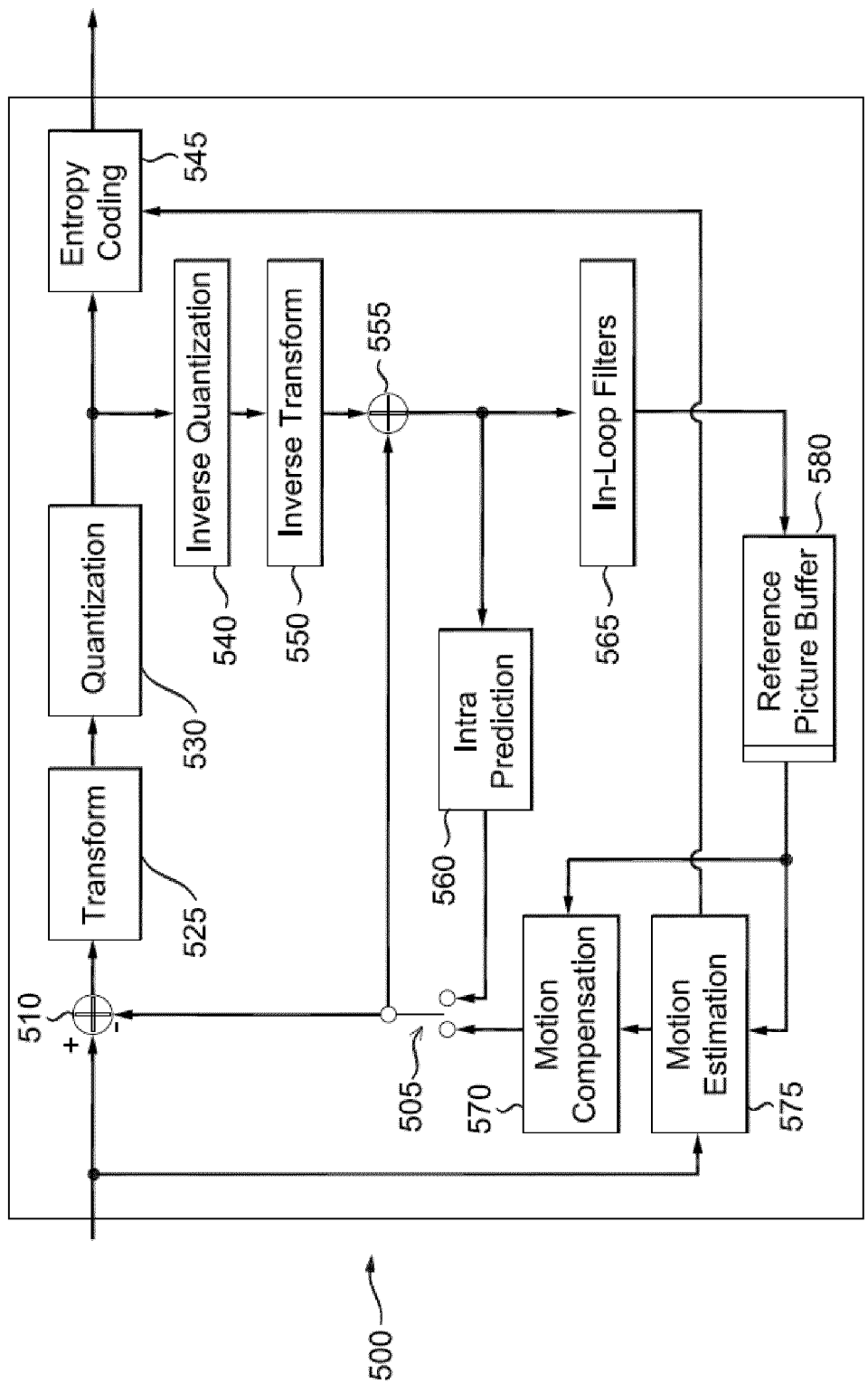
FIG. 5 illustrates a block diagram of an exemplary HEVC video encoder.

FIG. 5 illustrates an exemplary HEVC encoder 500. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably. Usually but not necessarily the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock, a partition and a sub-block as specified in H.264/AVC or other video coding standards, and more generally to refer to an array of data of various sizes.

In the exemplary encoder 500, a picture is encoded by the encoder elements as described below. The picture to be encoded is processed in units of CUs. Each CU is encoded using either an intra or inter mode. When a CU is encoded in an intra mode, it performs intra prediction (560). In an inter mode, motion estimation (575) and compensation (570) are performed. The encoder decides (505) which one of the intra mode or inter mode to use for encoding the CU, and indicates the intra/inter decision by a prediction mode flag. Prediction residuals are calculated by subtracting (510) the predicted block from the original image block.

Figure 6B:
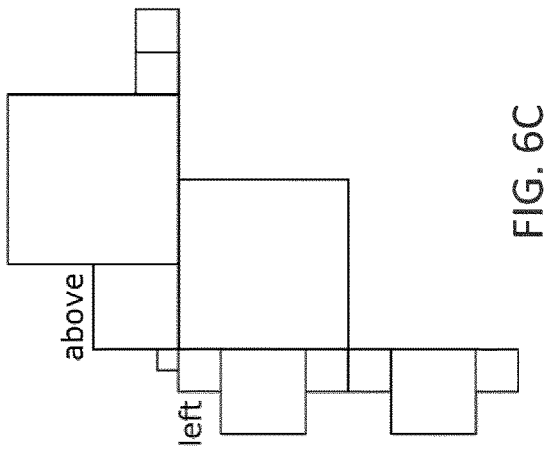
FIG. 6B shows that reference samples are copied along the direction indicated by the angular prediction mode.
Figure 6C:
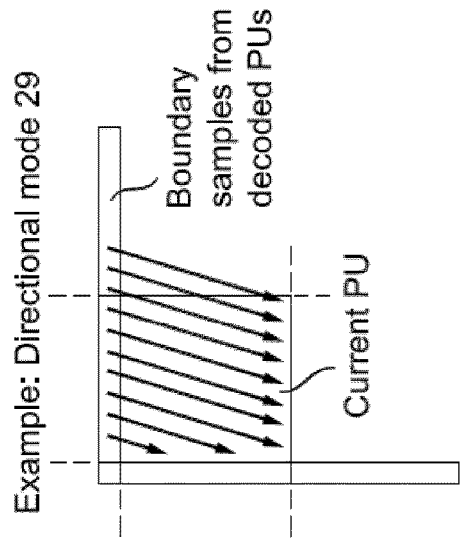
FIG. 6C shows neighboring left and top blocks relative to a current block.
Figure 6A:
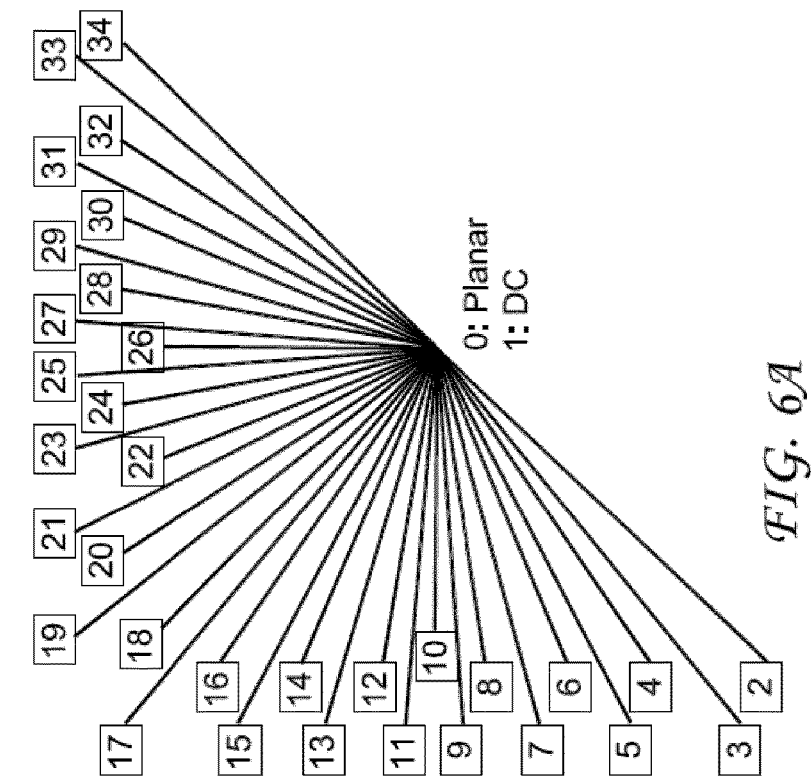
FIG. 6A shows a set of 35 intra prediction modes that are available in HEVC.

PUs in intra mode are predicted from reconstructed neighboring samples within the same slice. A set of 35 intra prediction modes is available in HEVC, including a DC, a planar and 33 angular prediction modes, as shown in FIG. 6A. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode as shown in an example in FIG. 6B. An angular prediction mode is also referred to as a directional prediction mode in the present application.

HEVC considers three most probable modes (MPMs), MPM0, MPM1 and MPM2, when coding the luma intra prediction mode predictively, as shown in TABLE 2, where "L" represents the intra prediction mode of the neighboring left block and "A" represents the intra prediction mode of the neighboring above block. The neighboring and left blocks may have different sizes from the current block, as shown in FIG. 6C. Among the three most probable modes, the first two are initialized by the luma intra prediction modes of the above and left PBs if those PBs are available and are coded using an intra prediction mode. Any unavailable intra prediction mode is considered to be the DC mode.

TABLE 2

| Conditions | | MPM0 | MPM1 | MPM2 |
|---|---|---|---|---|
| L = A | L ≠ Planar and L ≠ DC | L | L + 1 | L − 1 |
| | Otherwise | Planar | DC | 26 (Vertical) |
| L≠A | L ≠ Planar and A ≠ Planar | L | A | Planar |
| | otherwise L ≠ DC and A ≠ DC | L | A | DC |
| | otherwise | L | A | 26 (Vertical) |

When the first two most probable modes are not equal, the first most probable mode (MPM0) is set to L, the second most probable mode (MPM1) is set to A, and the third most probable mode (MPM2) is set equal to the Planar mode, DC, or vertical, according to which of these modes, in this order, is not a duplicate of one of the first two modes. When the first two most probable modes are the same, if this first mode has the value Planar or DC, the second and third most probable modes are assigned as Planar, DC, or vertical, according to which of these modes, in this order, are not duplicates. When the first two most probable modes are the same and the first mode has an angular value, the second and third most probable modes are chosen as the two angular prediction modes that are closest to the angle (i.e., the value of k) of the first.

If the current luma prediction mode is one of three MPMs, only the MPM index is transmitted to the decoder. Otherwise, the index of the current luma prediction mode excluding the three MPMs is transmitted to the decoder by using a 5-bit fixed length code. Encoding the intra prediction mode using the MPM relies on the assumption that neighboring blocks are likely to share the same prediction mode, when the texture content is similar.

For an inter CU, the corresponding coding block is further partitioned into one or more prediction blocks. Inter prediction is performed at the PB level, and the corresponding PUs contain the information about how inter prediction is performed.

The motion information (i.e., motion vector and reference picture index) can be signaled in two methods, namely, "merge mode" and "advanced motion vector prediction (AMVP)."

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD.

In HEVC, the precision of the motion information for motion compensation is one quarter-sample (also referred to as quarter-pel or ¼-pel) for the luma component and one eighth-sample (also referred to as ⅛-pel) for the chroma components. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (525) and quantized (530). The quantized transform coefficients, as well as motion vectors and other syntax elements, are entropy coded (545) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (540) and inverse transformed (550) to decode prediction residuals. Combining (555) the decoded prediction residuals and the predicted block, an image block is reconstructed. In-loop filters (565) are applied to the reconstructed picture, for example, to perform deblocking/SAO filtering to reduce encoding artifacts. The filtered image is stored at a reference picture buffer (580).

Figure 7:
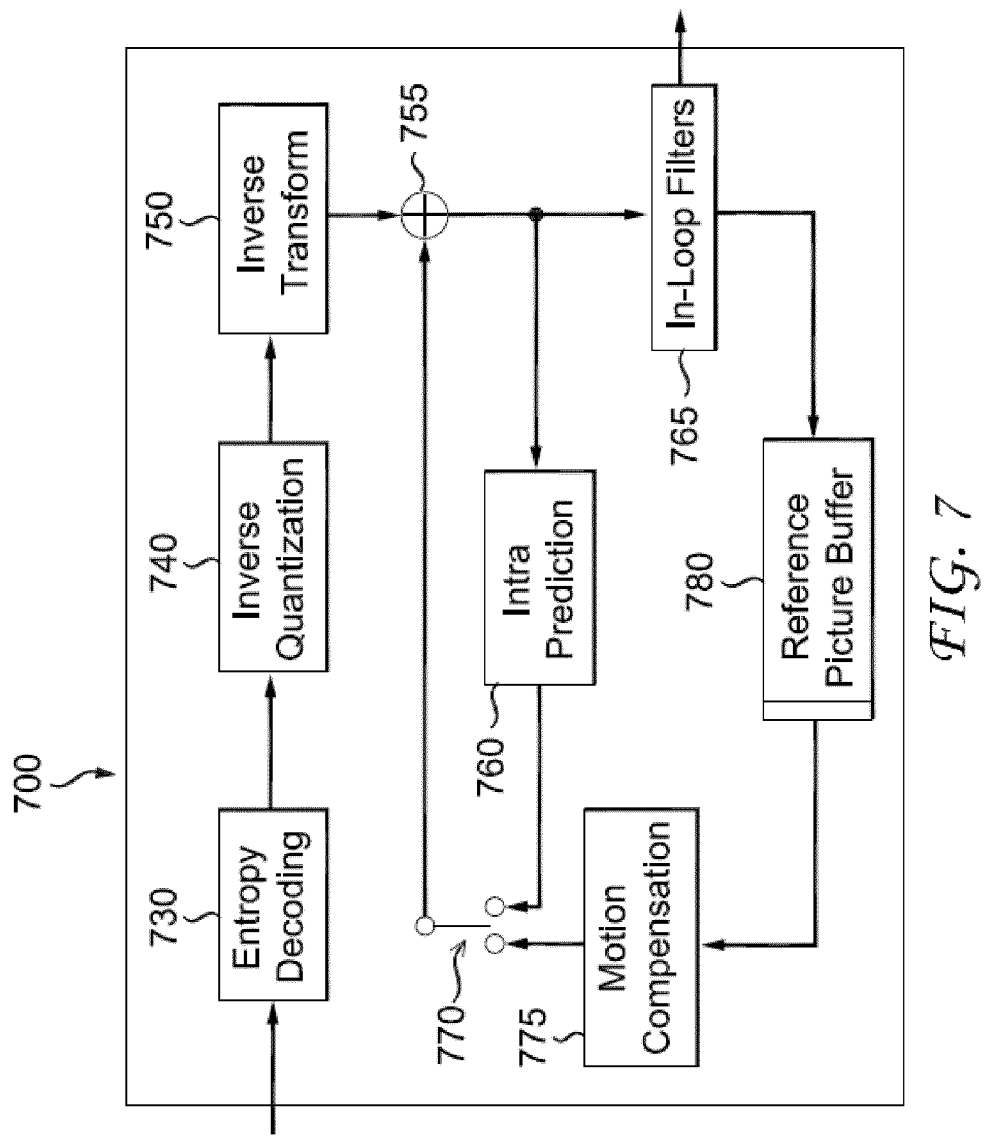
FIG. 7 illustrates a block diagram of an exemplary HEVC video decoder.

FIG. 7 illustrates a block diagram of an exemplary HEVC video decoder 700. In the exemplary decoder 700, a bitstream is decoded by the decoder elements as described below. Video decoder 700 generally performs a decoding pass reciprocal to the encoding pass as described in FIG. 5, which performs video decoding as part of encoding video data.

In particular, the input of the decoder includes a video bitstream, which may be generated by video encoder 500.

The bitstream is first entropy decoded (730) to obtain transform coefficients, motion vectors, and other coded information. The transform coefficients are de-quantized (740) and inverse transformed (750) to decode the prediction residuals. Combining (755) the decoded prediction residuals and the predicted block, an image block is reconstructed. The predicted block may be obtained (770) from intra prediction (760) or motion-compensated prediction (i.e., inter prediction) (775). As described above, AMVP and merge mode techniques may be used to derive motion vectors for motion compensation, which may use interpolation filters to calculate interpolated values for sub-integer samples of a reference block. In-loop filters (765) are applied to the reconstructed image. The filtered image is stored at a reference picture buffer (780).

Aligning

Figure 8:
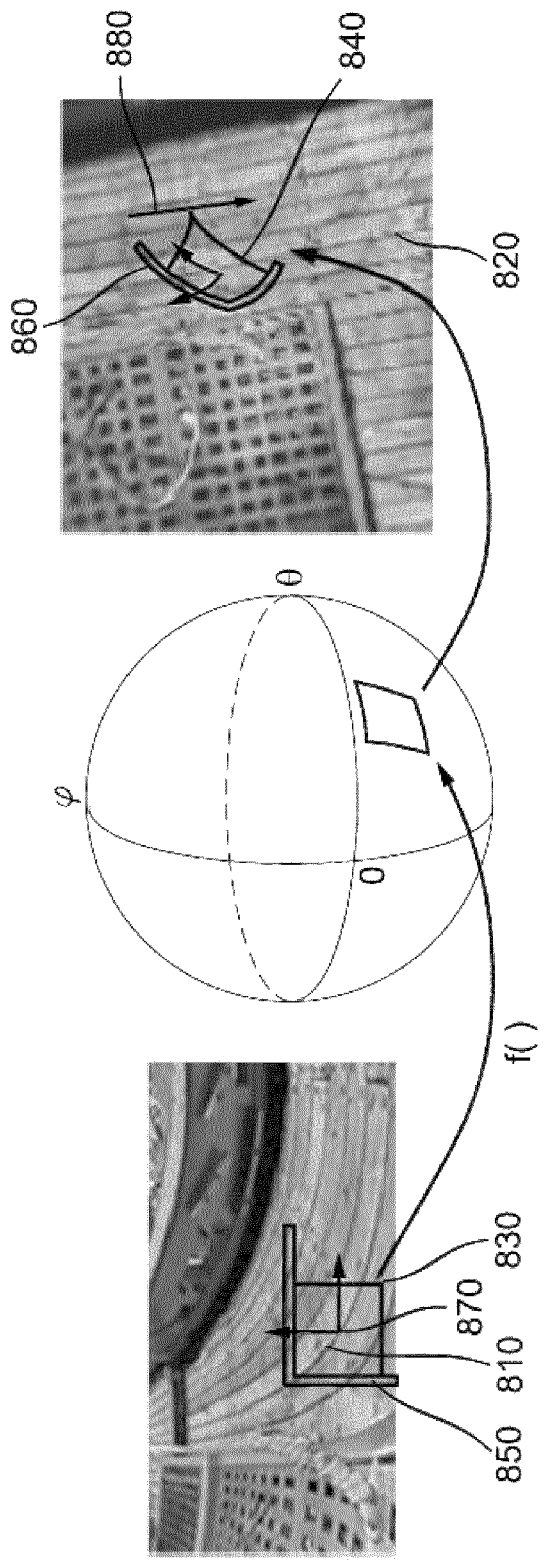
FIG. 8 illustrates an example wherein a straight line in the rendered frame is not seen as a straight line in the frame to be encoded.

FIG. 8 illustrates an example wherein a straight line (820) in the rendered frame is not seen as a straight line (810) in the frame to be encoded. In particular, FIG. 8 illustrates local mapping and rendering of a current prediction block (830) and the corresponding reference samples (850). In the local mapping and rendering, only a small portion around the prediction block is mapped to the rendered version. The left image is a cropped portion of an exemplary equi-rectangular frame F to be encoded. The right image is a cropped portion in the exemplary rendered frame to illustrate a local rendered version (840) of the prediction block. Neighboring samples (850) of the prediction block (830) in the equi-rectangular frame are mapped to neighboring area (860) in the rendered frame G. The frame of reference (870) is centered at the center of the prediction block. The arrow (880) shows a possible directional mode might be chosen by a traditional encoder if the rendered version is encoded.

In the right image of FIG. 8, it is reasonable to assume that the intra prediction mode may propagate along the straight lines in the rendered frame and MPMs would improve the coding efficiency. However, in the equi-rectangular frame, the straight lines are no longer straight in the prediction block (830), and thus directly applying MPMs when encoding the intra prediction mode of a block in the equi-rectangular content may not be very efficient.

We propose to improve the MPM derivation process for omni-directional videos, for example, by adapting the intra prediction modes of neighboring blocks to respect the geometry in the rendered frame.

We note that the geometry change in the equi-rectangular frame is in the vertical direction. In one embodiment, we first convert a neighboring intra prediction mode in the 2D frame F into a direction (i.e., angle) in the rendered frame G, then convert the direction in G to an intra prediction mode for the current block. That is, the neighboring intra prediction mode is now aligned to the current block and is represented at the same vertical level as the current block, and thus, may counter the effect of the geometry change caused by the equi-rectangular mapping.

Figure 9:
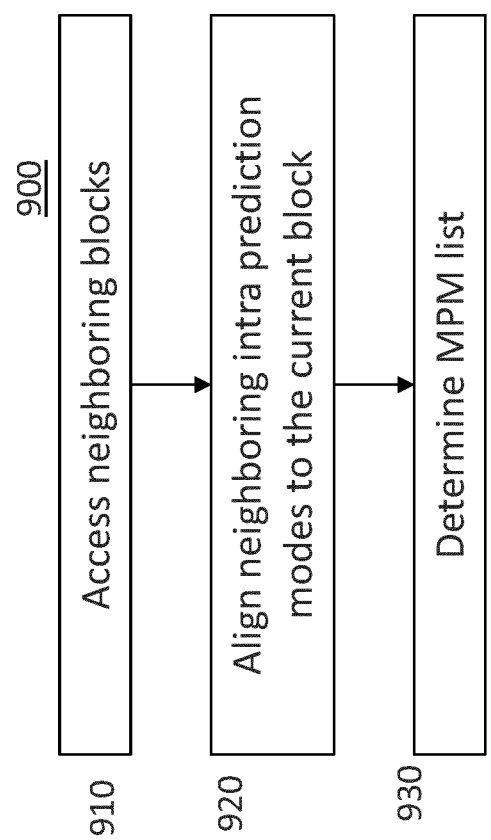
FIG. 9 shows an exemplary method for adapting the MPM list for encoding or decoding the intra prediction modes, according to an exemplary embodiment of the present principles.

FIG. 9 shows an exemplary method 900 for adapting the MPM list for encoding or decoding the intra prediction modes, according to an exemplary embodiment of the present principles. Method 900 can be used at the encoder or decoder side. When used at the encoder side for a current block to be encoded, neighboring left and above blocks can be accessed (910). The intra prediction modes for the neighboring blocks then can be converted (920) in order for them to be aligned to the current block. Then the MPM list can be determined (930) based on the converted intra prediction modes for the neighboring blocks. Then the current intra prediction mode tested for the current block may be encoded. If the current intra prediction mode is in the MPM list, only the index of the intra prediction mode in the MPM list is encoded. Otherwise, the intra prediction mode may be encoded by fixed length encoding. If the RD cost for the current intra prediction mode is smaller than the RD costs for other intra prediction modes and is smaller than the RD costs for inter prediction, the current block may choose to use the current intra prediction mode for the current block.

When method 900 is used at the decoder side, if the bitstream indicates that the intra prediction mode for the current block is encoded as one of the MPMs, the decoder decodes the MPM index. Neighboring left and above blocks can be accessed (910). The intra prediction modes for the neighboring blocks then can be converted (920) in order for them to be aligned to the current block. Then the MPM list can be determined (930) based on the converted intra prediction modes for the neighboring blocks. The intra prediction mode then can be decoded as one of the MPMs based on the decoded MPM index.

Method 900 only considers left and above blocks for neighboring blocks. More generally other blocks can also be considered as neighboring blocks.

Using the MPMs derived according to HEVC as examples, TABLE 3 shows exemplary adjusted MPMs, where $T_L^{-1}$ or $T_A^{-1}$ converts the intra prediction mode index of the left or above neighboring block into an angle in the rendered frame, respectively, based on the vertical location, for example, indicated by a warping index of the left or above block, and $T_c$ converts the angle in the rendered frame back to an intra prediction mode index, based on the vertical location, for example, indicated the warping index of the current block. The conversions of "$T_c$" and "$T_L^{-1}$" ("$T_A^{-1}$") can be combined, for example, as $F=T_c(T_L^{-1}(\ ))$ or $F=T_c(T_A^{-1}(\ ))$, wherein whether to use "$T_L^{-1}$" or "$T_A^{-1}$" depends on whether the corresponding MPM is from the neighboring left or above block.

TABLE 3

| Conditions | | MPM0 | MPM1 | MPM2 |
|---|---|---|---|---|
| $T_c(T_L^{-1}(L)) = T_c(T_A^{-1}(A))$ | L≠Planar and L≠DC | $T_c(T_L^{-1}(L))$ | $T_c(T_L^{-1}(L+1))$ | $T_c(T_L^{-1}(L-1))$ |
| | Otherwise | Planar | DC | Vertical |
| $T_c(T_L^{-1}(L)) \neq T_c(T_A^{-1}(A))$ | L≠Planar and A≠Planar | $T_c(T_L^{-1}(L))$ | $T_c(T_A^{-1}(A))$ | Planar |
| | otherwise L≠DC and A≠DC | $T_c(T_L^{-1}(L))$ | $T_c(T_A^{-1}(A))$ | DC |
| | Otherwise | $T_c(T_L^{-1}(L))$ | $T_c(T_A^{-1}(A))$ | Vertical |

In TABLE 3, $T_c(T_L^{-1}(\ ))$ is applied to L+1 or L−1 when L≠Planar and L≠DC. It may occur that $T_c(T_L^{-1}(L+1))$ or $T_c(T_L^{-1}(L-1))$ is the same as $T_c(T_L^{-1}(L))$. To still get three different MPMs, in a different embodiment, $T_c(T_L^{-1}(\ ))$ can be applied to L for modes L+1 and L−1, and MPM1 and MPM2 are adjusted to $T_c(T_L^{-1}(L))+1$ and $T_c(T_L^{-1}(L))-1$, respectively. Namely, when "$T_c(T_L^{-1}(L))=T_c(T_A^{-1}(A))$" and "L≠Planar and L≠DC," the MPMs may be derived as:

TABLE 3A

| Conditions | MPM0 | MPM1 | MPM2 |
|---|---|---|---|
| $T_c(T_L^{-1}(L)) = T_c(T_A^{-1}(A))$, L≠Planar and L≠DC | $T_c(T_L^{-1}(L))$ | $T_c(T_L^{-1}(L)) + 1$ | $T_c(T_L^{-1}(L)) - 1$ |

In the following, we describe how to determine the conversion "$T_i$" and "$T_i^{-1}$" for equi-rectangular mapping in detail, wherein $T_i$ maps an angle in the rendered frame to an intra prediction mode index expressed in the decoded frame (or the frame to be encoded), for example, from angle [45°, . . . , 135°], DC or Planar to index [0, . . . , 35] in HEVC, and $T_i^{-1}$ maps an intra prediction mode index into an angle in the rendered frame, for example, from intra prediction mode index [0, . . . , 35] to angle [45°, . . . , 135°], DC or Planar in HEVC. We define by construction T(DC)=1, $T^{-1}(1)$=DC, T(Planar)=0, $T^{-1}(0)$=Planar for all warping indices.

FIG. 10A shows a normalized 2D frame in the x-y coordinate system, and FIG. 10B shows an exemplary warping index deduction for equi-rectangular mapping. Here, the warping index only depends on the y coordinate of the block, for example, but not limited to, using the center, corner of the block for the y coordinate of the block. For ease of notation, we denote the point used for indicating the y coordinate of the block as the anchor point. The evolution of the warping index is guided by cos(y) because of the property of the equi-rectangular mapping. In practice, given the number of warping indices N, we may calculate the warping index w of a block using:

$$w(x,y)=\lceil N(1-\cos(\pi y))\rceil$$

where (x,y) are the normalized coordinates of the block in a picture as shown in FIG. 10A. With this function, we may get at most (N+1) different tables of direction conversion, one per warping index. Other scaling factors or variations can be used for obtaining the warping index. Generally, the warping index can be calculated based on the mapping used to generate the 2D frame.

FIG. 11A illustrates an exemplary workflow for computing the conversion "T," according to an embodiment of the present principles.

Because equi-rectangular mapping only distorts the images in the vertical direction, we set x=0 without loss of generality. For a given warping index w, a point corresponding to the y coordinate y and x=0 is:

$$P = \begin{bmatrix} 0 \\ y \end{bmatrix} \quad (8)$$

and the warping index can be calculated as:

$$w=\lceil N(1-\cos(\pi y))\rceil \quad (9)$$

P', the image of P by f, can be computed as:

$$P'=f(P) \quad (10)$$

$P^{3d}$, the image of P' by 3d, can be computed as:

$$P^{3d}=3d(P') \quad (11)$$

Then P" can be computed using the proj( ) function: P"=proj($P^{3d}$).

The point pointing at direction d from P can be expressed as:

$$Q = P + \epsilon\, dP \quad (12)$$

with $$dP = \begin{bmatrix} \cos(\alpha) \\ \sin(\alpha) \end{bmatrix} \quad (13)$$

where α is the direction angle of intra prediction mode index d (corresponding to the angle of each direction index of the warping index 0), i.e.:

$$\alpha=T_0^{-1}(d) \quad (14)$$

Q', the image of Q by f, can be computed as:

$$Q'=f(Q) \quad (15)$$

$Q^{3d}$ the image of Q' by 3d, can be computed as:

$$Q^{3d}=3d(Q')$$

Q", the image of $Q^{3d}$ by proj, can be computed as:

$$Q''=\text{Proj}(Q^{3d}) \quad (16)$$

The vector representing the difference between P" and Q", dP", can then be calculated as:

$$dP''=Q''-P'' \quad (17)$$

Consequently, the angle of warping index w at direction d can be calculated as:

$$\beta = T_w^{-1}(d) = \operatorname{atan}\left(\frac{dP''_y}{dP''_x}\right) \quad (18)$$

where $dP''_x$ and $dP''_y$ are the x and y components of dP". Then $T_w$ can be calculated as the inverse of $T_w^{-1}$.

In another embodiment, the direction is interpreted in the local rendered frame of the point, as shown in FIG. 11B. Here we compute the function $S_i$ which maps an angle in the rendered frame to an intra prediction mode index in the rendered frame.

For a given warping index w, corresponding to the y coordinate y, i.e.:

$$P = \begin{bmatrix} x \\ y \end{bmatrix} \quad (19)$$

and warping index $$w=\lceil N(1-\cos(\pi y))\rceil \quad (20)$$

P', the image of P by f, can be computed as:

$$P'=f(P) \quad (21)$$

$P^{3d}$, the image of P' by 3d, can be computed as:

$$P^{3d}=3d(P') \quad (22)$$

The projection function from P, by construction, is:

$$P'' = \text{Proj}(P^{3d}) = \begin{bmatrix} 0 \\ 0 \end{bmatrix} \quad (23)$$

In the frame G, compute the point pointing at direction d corresponding to angle α from P":

$$Q'' = P'' + \epsilon\, dP'' = \epsilon\, dP'' \quad (24)$$

with $$dP'' = \begin{bmatrix} \cos(\alpha) \\ \sin(\alpha) \end{bmatrix} \quad (25)$$

where α is the direction angle of intra prediction mode index d (corresponding to the angle of each direction index of the warping index 0), i.e.:

$$\alpha = S_0^{-1}(d) \quad (26)$$

Point $Q^{3d}$ can be computed as:

$$Q^{3d} = \text{Proj}^{-1}(Q'') \quad (27)$$

Then Q' can be computed as:

$$Q' = 3d^{-1}(Q^{3d}) \quad (28)$$

Q can be computed as:

$$Q = f^{-1}(Q') \quad (29)$$

The vector dP representing the difference between Q and P can be calculated as:

$$dP = Q - P \quad (30)$$

Consequently the angle of warping index w for direction d can be calculated as:

$$\beta = S_w^{-1}(d) = \operatorname{atan}\left(\frac{dP_y}{dP_x}\right) \quad (31)$$

Note that, in the first embodiment as shown in FIG. 11A where d is an index of a direction expressed in the decoded frame (corresponding to function T), for a straight line in the rendered frame, the index d may vary along the vertical axis, whereas in the second embodiment as shown in FIG. 11B, the index d is the same for all the blocks. However, the difference lies in the prediction stage: for the first embodiment, the block prediction direction will be the one associated with d, whereas in the second embodiment, the conversion from the rendered frame to the decoded frame is necessary.

For intra directional modes, the conversion (the function T or S) that transforms a given angle in the rendered frame to a directional mode index, and the inverse conversion (the function $T^{-1}$ or $S^{-1}$) that transforms a given directional mode index back to an angle in the rendered frame (angle β), can be pre-calculated and stored in a translation table, such as TABLE 4 that is generated for HEVC intra prediction modes.

TABLE 4

| Warping index w | directional mode index d | | | |
|---|---|---|---|---|
| | d = 2 | d = 3 | ... d = 33 | d = 34 |
| w = 0 | 135° | 129.375° | ... 39.375° | 45° |
| w = 1 | 131° | 126° | ... 36° | 39° |
| w = 2 | 130° | 135° | ... 35° | 38° |
| ... | | | | |

For a warping index w in the table, we provide the corresponding angle in degrees for individual indices of directional modes. Note that warping index 0 represents, by construction, the angles in conventional HEVC. Then we define $T_i(x)$ as the intra prediction directional mode index in the table, at the warping index i, the closest to the one with angle x. For example, in TABLE 4, $T_2(134.5)=3$: for warping index 2, the closest directional mode index for 134.5° is index 3 (corresponding to 135°). Similarly, for the inverse transform, $T^{-1}_i(j)$ is the angle corresponding to directional mode index j at the warping index i in TABLE 4. For example, $T^{-1}_1(33)=36°$.

Figure 12:
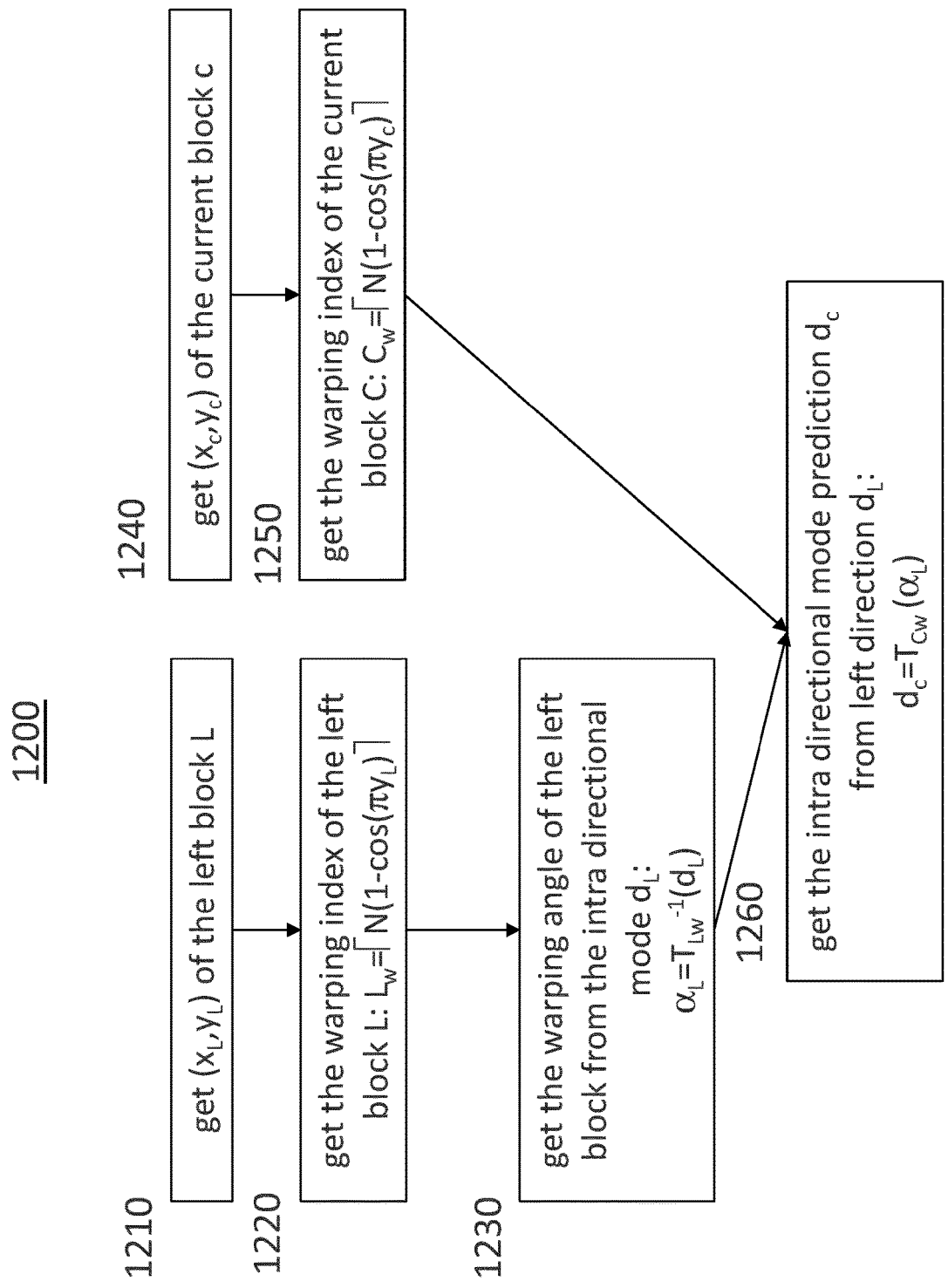
FIG. 12 illustrates an exemplary process for obtaining an MPM based on the neighboring left block when the equi-rectangular mapping is used, according to an embodiment of the present principles.

FIG. 12 illustrates an exemplary process 1200 for obtaining an MPM based on the neighboring left block when the equi-rectangular mapping is used, according to an embodiment of the present principles. Method 1200 can be used to obtain $T_c(T_L^{-1}(L))$ as shown in TABLE 3 or TABLE 3A. The present principles can also be used to obtain MPMs based on other neighboring blocks. Note that $T_L^{-1}(\ )$ calculates the warping index of the neighboring left block, and converts the intra prediction mode index of the left block into an angle, and that $T_c(\ )$ gets the warping index of the current block, and converts the angle from $T_L^{-1}$ back to an intra prediction mode index.

To compute $T_L^{-1}(L)$, the coordinate $(x_L, y_L)$ of the left block L is obtained (1210). Then the warping index of the left block can be obtained (1220) as $L_w = \lceil N(1-\cos(\pi y_L))\rceil$, wherein $y_L$ indicate the location of the left block. Then the warping angle for the left block can be calculated (1230) as $\alpha_L = T_{Lw}^{-1}(d_L)$, wherein $d_L$ is the intra prediction mode index for the left block.

To compute $T_c(\ )$, the coordinate $(x_c, y_c)$ of the current block L is obtained (1240). Then the warping index of the current block can be obtained (1250) as $C_w = \lceil N(1-\cos(\pi y_c))\rceil$, wherein $y_c$ indicate the location of the left block. Then the adapted intra prediction mode index for the MPM based on the left block can be calculated (1260) as $d_c = T_{Cw}(\alpha_L) = T_{Cw}(T_{Lw}^{-1}(d_L))$.

It should be noted that the new intra prediction mode index for the left block is at the same vertical level as the current block, and comparable with the intra prediction mode of the current block. That is, the angles for the neighboring left block and the current block are represented in the rendered frame, where the intra modes are more likely to propagate as discussed above.

Figure 13:
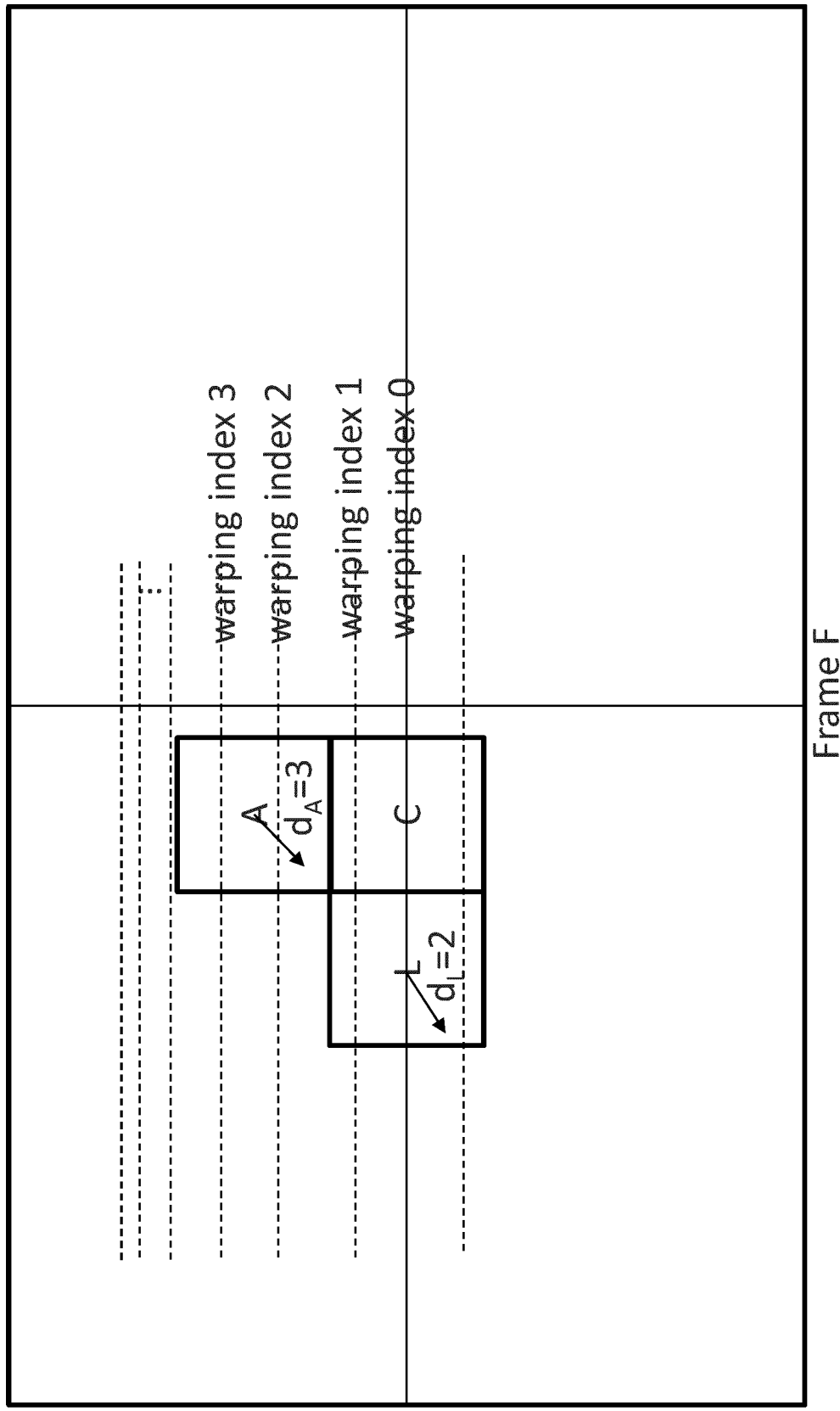
FIG. 13 illustrates an exemplary current block C at the equator, whose neighboring left block L is also at the equator.

FIG. 13 illustrates an exemplary current block C at the equator, whose neighboring left block L is also at the equator. Using TABLE 4 as an example for an equi-rectangular mapping, the following MPM derivation may occur:

the warping index of the left block is 0 because the left block is at the equator. The decoded directional intra mode is $d_L=2$. From TABLE 4, we deduce the left angle: $\alpha_L=135°$ (first row, first column).

the warping index of the current block is also 0 because the current block is also at the equator. The predicted intra direction from left block is then 2 (closest angle is at first row, first column). For equi-rectangular mapping, when the current block and a neighboring block are at the same vertical level, for example, when the anchor points for of the current block and the neighboring block are at the same vertical level, there is no need for conversion. Note that, for different block size, the left and current blocks do not necessarily share the same warping index.

the warping index of the above block A is 2. The decoded intra prediction mode index is $d_A=3$. From TABLE 4, we deduce the above angle: $\alpha_A=135°$ (third row, second column).

The predicted intra direction from above block is then 2 (closest angle is at first row, first column).

According to MPM derivation, the two neighboring blocks provide the same directional predictor, i.e., $T_c(T_L^{-1}$ (L))=$T_c(T_A^{-1}(A))$, L≠Planar and L≠DC. Using TABLE 3A, the three MPM are then: MPM0=$T_c(T_L^{-1}(L))$=2, MPM1=$T_c(T_L^{-1}(L))$+1=3, and MPM2=$T_c(T_L^{-1}(L))$−1=34.

Figure 17:
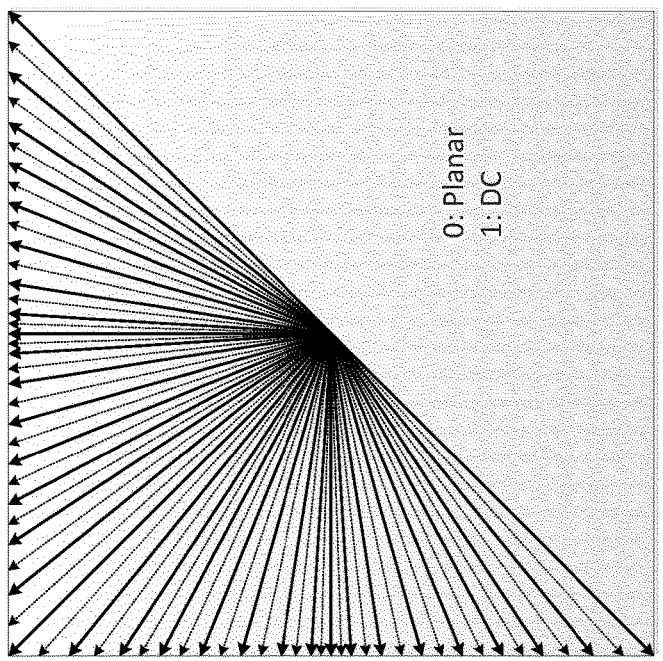
FIG. 17 shows the intra direction modes in the joint exploration software (JEM) of JVET (Joint Video Exploration Team).

In the above, we describe adjusting the neighboring intra prediction modes, based on the vertical levels of the neighboring blocks and the current block, using HEVC MPMs as example. The present principles can be applied when MPMs are derived in different ways. For example, in the recent development, the joint exploration software (JEM) of JVET (Joint Video Exploration Team) uses twice as many intra direction modes as in HEVC, as depicted in FIG. 17. Also, it has been proposed to extend the MPM list from 3 to 6 intra modes. The derivation of the MPM list is detailed in TABLE 5. This new list also takes into account two modes derived from the neighboring left and above blocks. Instead of considering the first block from the top-left corner for the left and above candidates as shown in FIG. 6C, the final L and A candidates correspond to the most frequent modes among the neighboring blocks, to the left and to the right of the current block, respectively.

TABLE 5

| Conditions | | | MPM0 | MPM1 | MPM2 | MPM3 | MPM4 | MPM5 |
|---|---|---|---|---|---|---|---|---|
| L = A | L ≠ Planar and L ≠ DC | | L | Planar | L + 1 | L − 1 | L + 2 | DC |
|  | Otherwise | | Planar | DC | 26 (Ver) | 10 (Hor) | 2 | 18 |
| L ≠ A | L ≠ Planar and | L = DC or A = DC | L | A | Planar | Max − 1 | Max + 1 | Max + 2 |
|  | A ≠ Planar otherwise | otherwise | L | A | Planar | DC | Max + 1 | Min − 1 |
|  |  | L + A < 2 | L | A | 26 (Ver) | 10 (Hor) | 2 | 18 |
|  |  | otherwise | L | A | DC | Max − 1 | Max + 1 | Max + 2 |

For the MPMs as described in TABLE 5, the intra prediction mode ("L") on the left can be adjusted to ($T_C(T_L^{-1}(L))$), the intra prediction mode ("A") on the above can be adjusted to ($T_C(T_A^{-1}(A))$), the intra prediction modes mode=26, 10, 2, or 18 can be adjusted to ($T_C(T_L^{-1}(mode))$) or adjusted to ($T_C(T_A^{-1}(L))$), and the intra prediction mode ("Max") can be adjusted to ($T_C(T_{Max}^{-1}(Max))$), wherein Max stands for the highest direction index of a given codec, 33 in the case of HEVC and 64 in the case of JEM.

When a particular mapping is used and signalled in the stream, one can automatically deduce a relationship between the block coordinates and the warping index.

A first method is to signal the warping index used for the MPM translation. The signalling can be done at the sequence level, at the slice level, or at the CTU, CU or PU level. When signalled at block level, contextual and entropic coding is used to encode the warping index.

At the encoder side, the warping table may be constructed and sent at the sequence level, at the slice level, or at the block level. The construction of the table is considered an encoding method. Encoding of the table can used entropic and contextual coding.

When a particular mapping is used and signalled in the stream, one can automatically deduce the warping angles to be used. In this case, both encoder and decoder use the same table without the need to transmit it.

In the above, we discuss adjusting intra prediction modes for equi-rectangular mapping. For cube mapping, the mapping does not modify the classical modes within a cube face. However, modifications appear at the edges. FIG. 14A shows an example of cube mapping. Faces can be distributed differently in the rectangle frame. At some edges, a particular mapping has to be implemented for the encoder/decoder to point at the right location of the reconstructed neighbor on another face, rotated accordingly.

Then, the change of direction can be applied the same way, using the projection from sphere to cube. FIG. 14B shows an example of direction change at an edge. In this example, a block on the left face was coded with the directional mode depicted with segments. The MPM for the current block on the right will then be modified as shown with segments.

Reducing the Number of Available Intra Prediction Modes

FIG. 15 shows an exemplary equi-rectangular layout of an omnidirectional picture and the evolution of the local frame of reference along the vertical coordinate. As can be seen from FIG. 15, a dedicated local frame of reference, i.e., a system of coordinates that shows the deformations introduced by the projection, centered on the equator of the sphere (1510) is orthonormal. As we translate the frame of reference away from the center, along the vertical direction, the frame of reference (1520, 1530) is not orthonormal any longer. In particular, as the local frame of reference moves closer towards the top or bottom border (corresponding to the poles of the sphere), the local frame of reference becomes more and more "shrunk" in the vertical direction.

Figure 16D:
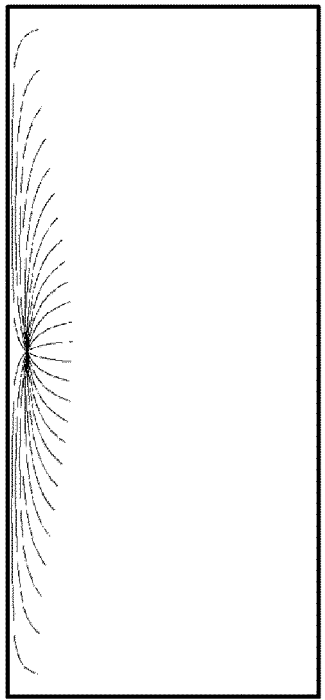
FIGS. 16A, 16B, 16C, 16D and 16E illustrate exemplary direction deformations from different locations along the Y axis in the case of an equi-rectangular video.
Figure 16E:
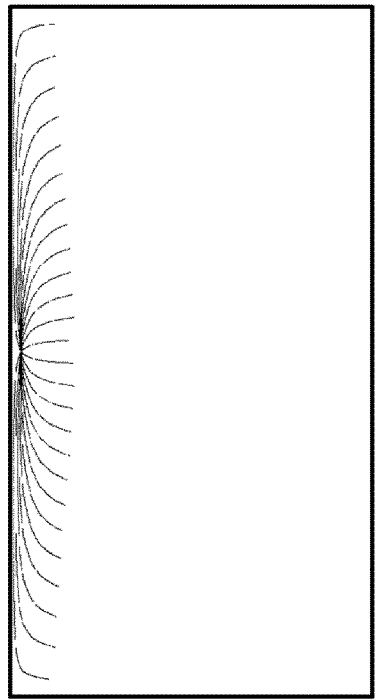
Figure 16A:
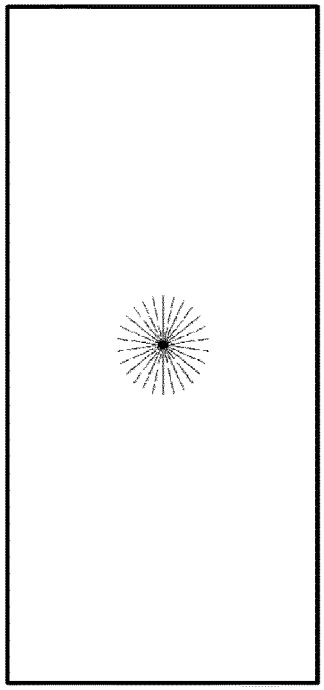
Figure 16B:
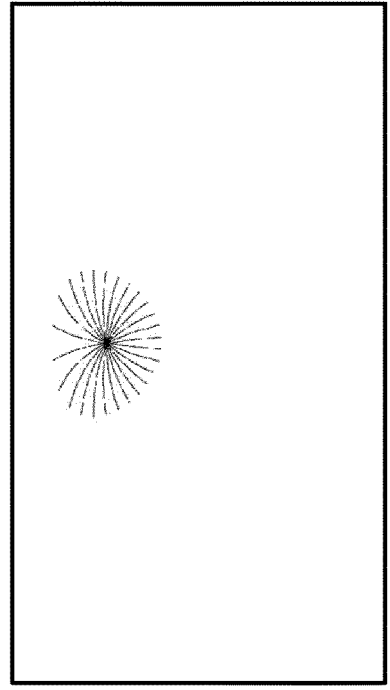
Figure 16C:
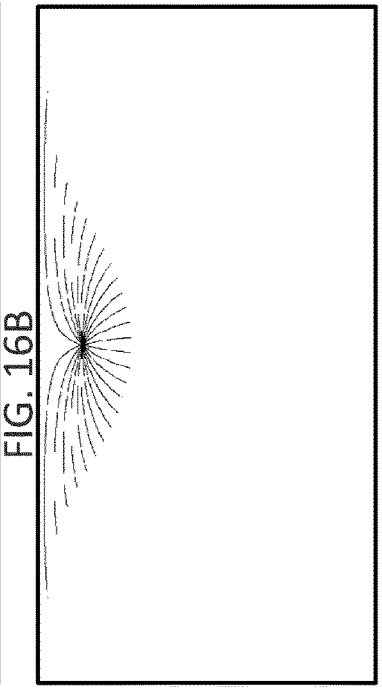

FIG. 16A, FIG. 16B, FIG. 16C, FIG. 16D and FIG. 16E show the images of the same pattern viewed from different latitudes: 0°, 45°, 66°, 80° and 85°, respectively. At equator as shown in FIG. 16A, all directions are available and regularly distributed. The closer to the pole the pattern is viewed, the more horizontal the directions (at the center) become in the equi-rectangular frame.

As discussed above for FIG. 6A and FIG. 6B, in directional intra prediction modes, a prediction of the current block is computed using the surrounding previously reconstructed samples and a direction of prediction, where the samples are "propagated" onto the current prediction block along the chosen direction. However, in omnidirectional videos, where the local frame of reference depends on its center position, thus not always orthonormal, the number of possible directions at a location in the frame could be reduced to improve compression efficiency. For example, in equi-rectangular (Er) layout, FIG. 16 shows that at the equator, all directions are available, but very close to the pole, only the horizontal directions would be relevant.

Based on the above observations, we propose to further improve the intra MPM derivation. In various embodiments, we may adapt the derivation of the MPM in order to take into account the reduction of intra directions depending on geometric distortions. The encoding method can also be adapted to reduce the number of modes to estimate for a block in omnidirectional videos. The coding of the syntax elements representing the intra direction can also be improved.

TABLE 6

| Conditions | | | MPM0 | MPM1 | MPM2 | MPM3 | MPM4 | MPM5 |
|---|---|---|---|---|---|---|---|---|
| F(L) = F(A) | L≠Planar and L≠DC | | F(L) | Planar | F(L) + d | F(L) − d | F(L) + 2d | DC |
| | Otherwise | | Planar | DC | F(26) (Ver) | F(10) (Hor) | F(2) | F(18) |
| F(L) ≠ F(A) | L≠Planar and R≠Planar | L = DC or A = DC | F(L) | F(A) | Planar | F(Max) − d | F(Max) + d | F(Max) + 2d |
| | otherwise | otherwise | F(L) | F(A) | Planar | DC | F(Max) + d | F(Min) − d |
| | otherwise | L + A < 2 | F(L) | F(A) | F(26) (Ver) | F(10) (Hor) | F(2) | F(18) |
| | | otherwise | F(L) | F(A) | DC | F(Max) − d | F(Max) + d | F(Max) + 2d |

TABLE 6 shows that the MPMs are adapted to d, where parameter d denotes the angle step size adapted to the geometric layout. For example, "F(L)+d" replaces "F(L)+1" for MPM2 when "L≠Planar and L≠DC" and "F(L)=F(A)." That is, we consider the angle adjacent to the angle corresponding to "F(L)" is "F(L)+d" since we may skip the intra prediction modes between "F(L)+1" and "F(L)+d−1." At the equator, d=1, and d increases (and more intra prediction modes skipped) as the block gets closer to the pole. The computation of d will be detailed further below.

We use the following notations:
a denotes the scale factor between the vertical and horizontal axis of the local frame of reference. By construction a=1 for standard videos or at the equator of equi-rectangular videos, and a=0 at the pole for equi-rectangular videos.

For a "standard" local frame (i.e., a=1), the number of directions is N(a), for example, 65 in the current JVET exploration model (JEM) or 33 in HEVC.

The "standard" angle step size in degree is s(a=1)=180/(N(1)−1). For example: 5.625° in HEVC.

We define the prediction angles of the "standard" intra direction of 180° as $Z(a=1)$, and of 45° below the horizontal direction and 135° above the horizontal directions $Z^-(a=1)=45°$ and $Z^+(a=1)=135°$, respectively.

Figure 18:
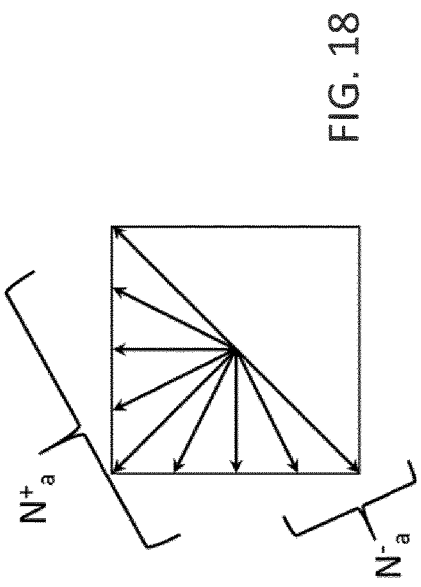
FIG. 18 shows the numbers of available intra prediction modes above and below the horizontal line, according to an exemplary embodiment of the present principles.
Figure 19D:
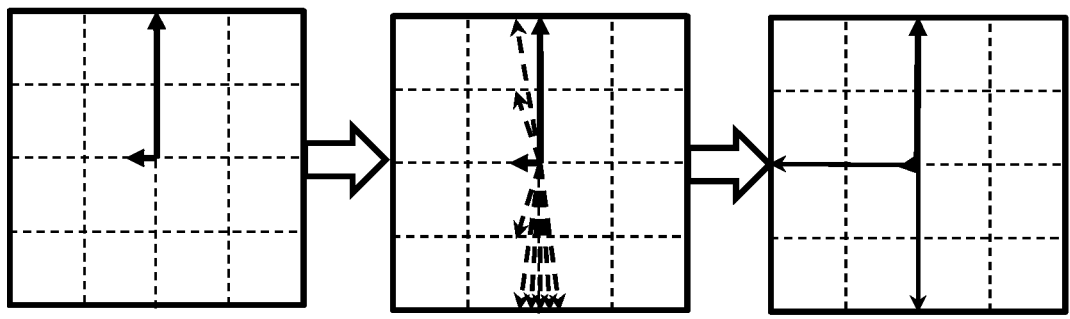
FIGS. 19A, 19B, 19C and 19D provide examples for calculating the available intra prediction modes for a=1, 0.5, 0.25, and 0.125, according to an exemplary embodiment of the present principles.
Figure 19C:
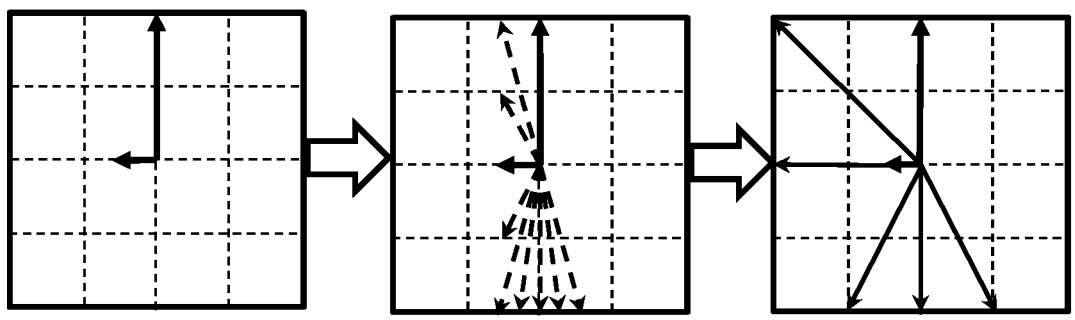
Figure 19B:
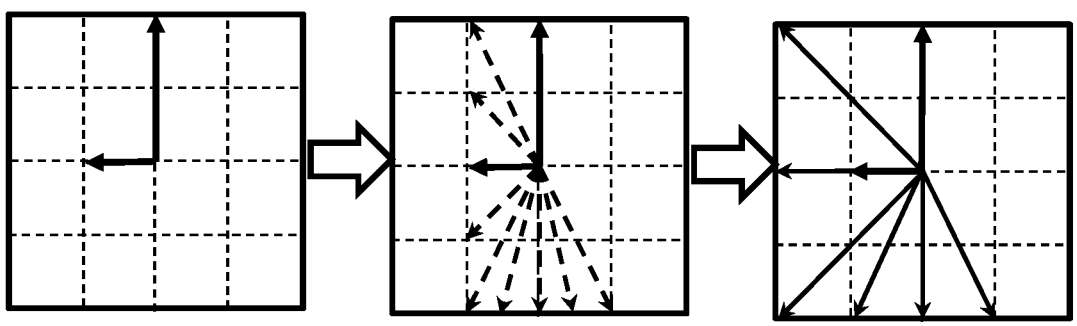
Figure 19A:
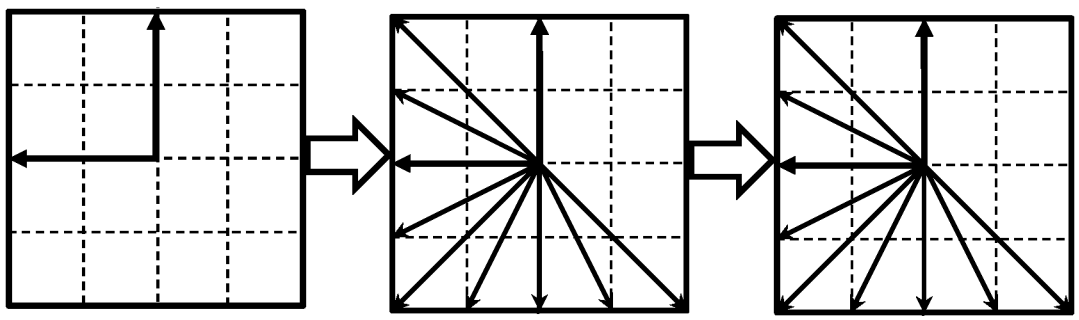

$N^-(a)=(N(a)-1)/4$ is the number of directions below the horizontal one and $N^+(a)=3(N(a)-1)/4$ is the number of directions above the horizontal, as shown in an example in FIG. 18.

by construction d(a=1)=1.

In order to deduce the directions for a given local frame $F_L$ with a scale factor a between the x and y axis, the following logic is applied:

The angles for a scale factor a are given by:

$$Z^-(a)=a\tan(a^*\tan(Z^-(1))), Z^+(a)=3^*Z^-(a) \quad (32)$$

Keeping the same angle step in the frame, we deduce the number of available intra prediction directions as:

$$N^-(a) = \left\lceil \frac{Z^-(a)}{s(1)} \right\rceil, N^+(a) = \left\lceil \frac{Z^+(a)}{s(1)} \right\rceil \quad (33)$$

We then deduce the parameter d:

$$d(a) = \left\lceil \frac{N^+(1)}{N^+(a)} + \frac{N^-(1)}{N^-(a)} \right\rceil \quad (34)$$

FIG. 19 provides examples for the above calculation for a=1, 0.5, 0.25, and 0.125. At the top of FIG. 19, the local frames of reference are shown. In the middle of FIG. 19, the angles for a scale factor a as calculated using Eq. (32) are shown, and the same number of directions are kept for each scale factor a. At the bottom of FIG. 19, we aim to maintain the angle step at the same level, and the number of directions is reduced as the scale factor a decreases. As can be seen from FIG. 19A, FIG. 19B and FIG. 19C, while the available set of intra prediction modes in FIG. 19A is different from the available set of intra prediction modes in FIG. 19B or FIG. 19C, the angle difference between two adjacent intra prediction modes around the horizontal direction in FIG. 19A is the same as the angle difference between two adjacent intra prediction modes around the horizontal direction in FIG. 19B or FIG. 19C. In FIG. 19D, all angles collapse on the horizontal direction.

To represent the reduced set of intra prediction modes, we may keep the same intra prediction mode indices for the remaining intra modes, and use the angle step d to indicate the angle difference between two adjacent modes. For example, the available intra prediction directional mode indices at the equator may be 2, 3, 4, . . . , with d=1, and the indices at another location may be 2, 5, 8, . . . , with d=3, while the same index corresponds to the same intra prediction mode. The encoder and decoder only use the available intra prediction modes. The parameter d is used by the encoder to build the MPM list, and can be either calculated in the decoder, or transmitted in the bitstream. For a codec with a uniform step d, a single parameter is used. For non-uniform steps, a look-up table can be either known by the decoder a priori, or transmitted via the bitstream, in a Sequence Parameter Set or Video Parameter Set for instance.

In another embodiment, the intra prediction mode indices are re-organized depending on the new steps that are set given then block location, latitude in the particular case of equi-rectangular projection. The new indices for the directional modes are contiguous and may range from 2 to N−1, wherein N now depends on the location.

As the number of available intra prediction directions decreases as the angle a decreases, the encoding of the intra direction can also be improved. As discussed above, 5-bit fixed length code is used to code the intra prediction mode when it is not included in the MPM list in HEVC, and 6-bit is used for JEM. For a given block, we propose to adapt the number of bits for the fixed length code to the following:

$$n = \lceil \log_2(N_a^+ + N_a^- + 1) \rceil. \quad (35)$$

For efficiency purposes, the directions coding and values can be decided on both encoder and decoder side, depending only on the local frame scale a. For equi-rectangular mapping, the local frame scale can be calculated as:

$$a = \cos(\varphi) \quad (36)$$

with the latitude angle $$\varphi = \frac{\pi\left(\frac{h}{2} - y\right)}{h} \quad (37)$$

We notice from Eq. (37) that the latitude angle φ relies on "y," the vertical location of the block. Subsequently, the local frame of reference scale a also depends on the vertical location (see Eq. (36)), and the parameter d and the number of bits for the fixed length code n rely on the vertical location as well ((see Eqs. (34) and (35)).

In order to simplify the encoding and the relationship between the number of directions and the location of the prediction block, a corresponding table can be constructed, as shown in an example in TABLE 7.

TABLE 7

| abs (φ) value (rad) | [0, 0.78] | [0.78, 1.26] | [1.26, 1.47] | [1.47, 1.50] | [1.50, pi/2] |
|---|---|---|---|---|---|
| Corresponding pixel row | [0.25 * h, 0.75 * h] | [0.1 * h, 0.25 * h] [0.75 * h, 0.9 * h] | [0.05 * h, 0.1 * h] [0.9 * h, 0.95 * h] | [0.02 * h, 0.05 * h] [0.95 * h, 0.98 * h] | [0, 0.02 * h] [0.98 * h, h] |
| Number of directions | 33 | 16 | 8 | 4 | 2 |

For abs(φ) value=[0, 0.78] (rad), the pixels between [0.25*h,0.75*h], wherein "h" is the height of the picture, all intra prediction directional modes are available and an intra prediction directional mode for a block can choose from all 33 modes. For abs(q) value=[0.78, 1.26] (rad), the pixels between [0.1*h,0.25*h] or [0.75*h,0.9*h], about half (16) of the intra prediction directional modes are available, with indices at 0-15. Thus, the intra prediction directional mode for a block can only choose from these 16 modes. For abs(φ) value=[1.26, 1.47] (rad), the pixels between [0.05*h,0.1*h] or [0.9*h,0.95*h], about a quarter (8) of the intra prediction directional modes are available, with indices at 0-7.

Figure 20:
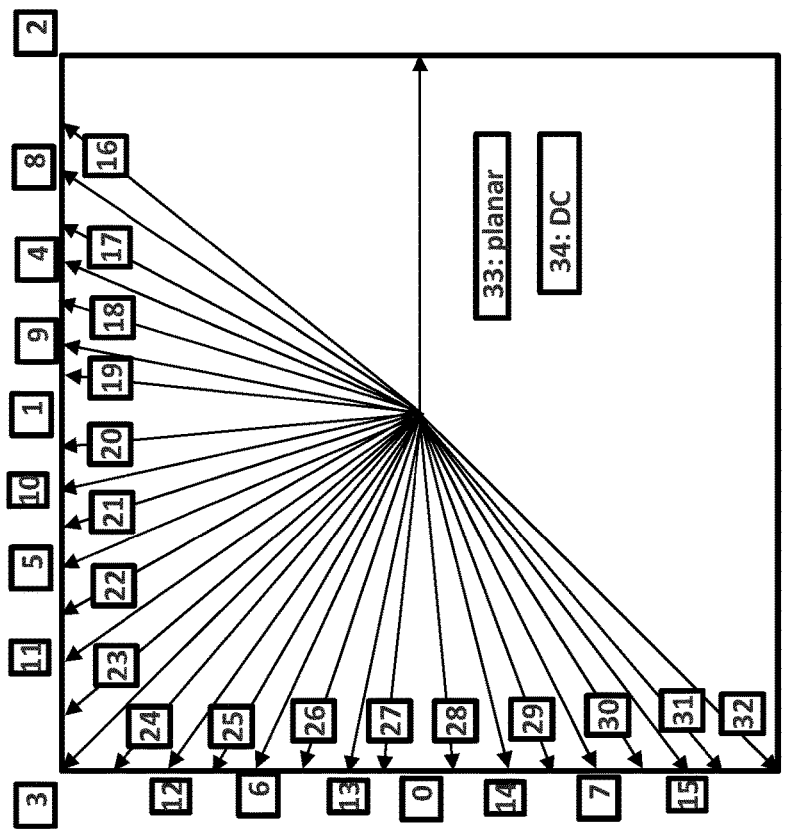
FIG. 20 shows an example of grouping directions and reordering of intra direction, according to an exemplary embodiment of the present principles.

FIG. 20 shows an example of grouping directions and reordering of intra direction to facilitate deriving the modes depending on the number of available directions. The number of directions, as a function of the latitude angle φ, is shown in TABLE 7. Rather than assigning indices to the intra prediction directional modes in a continuous way as in HEVC or JEM, we may assign indices in an interlaced manner. In the example as shown in TABLE 7 and FIG. 20, the mode indices are re-organized for the directions of the HEVC intra prediction modes.

Here in FIG. 20, when there are only two available modes, modes 0 and 1 are kept. When there are four available modes, modes 0-3 are kept. When there are 8 available modes, modes 0-7 are kept. When there are 16 modes, modes 0-15 are kept. Thus, the available intra prediction modes are always represented by a set of contiguous intra prediction mode indices, while the ranges may be different depending on the number of kept modes. In this arrangement of mode indices, the same intra prediction mode index always corresponds to the same intra prediction direction.

Figure 21A:
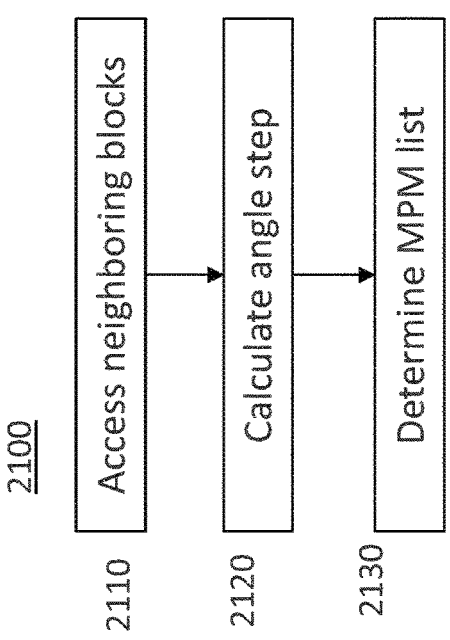
FIG. 21A illustrates an exemplary method for encoding or decoding an intra prediction mode for the current block using the MPM list, according to an embodiment of the present principles.
Figure 21B:
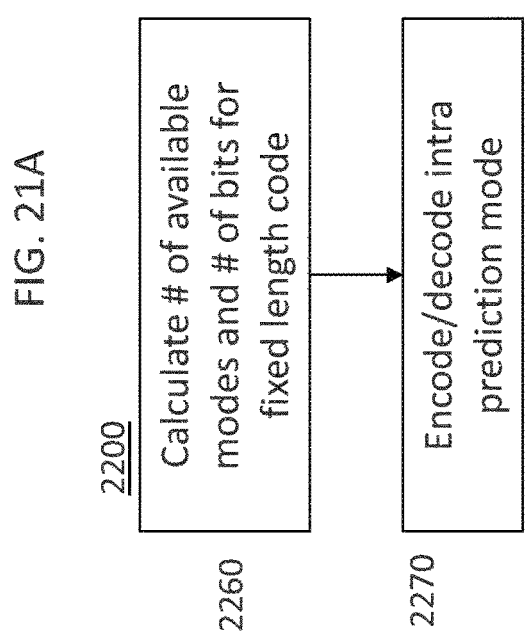
FIG. 21B illustrates an exemplary method for encoding or decoding an intra prediction mode for the current block using a fixed length code, according to an embodiment of the present principles.

FIG. 21A illustrates an exemplary method 2100 for encoding or decoding an intra prediction mode for the current block using the MPM list, according to an embodiment of the present principles. FIG. 21B illustrates an exemplary method 2200 for encoding or decoding an intra prediction mode for the current block using a fixed length code, according to an embodiment of the present principles.

When used at the encoder side, the intra prediction modes for neighboring left and above blocks are obtained (2110). Angle step size d can be calculated (2120), for example, using Eq. (34) or a look-up table associating the vertical location with parameter d. As the angle step size d changes, the number of available intra prediction modes also changes. The MPM list then can be adjusted (2130) based on the angle step size d, for example, as shown in TABLE 6 for JEM. If a current intra prediction mode under test for encoding is one of the MPMs, the corresponding MPM index is determined and the encoding cost for using the current intra prediction mode can be calculated. The RD cost can be compared with other prediction modes to decide whether the current intra prediction mode is to be chosen for the current block.

If the current intra prediction mode under test is not one of the MPMs, the encoder can calculate (2260) the number of available intra prediction modes and the number of bits for the fixed length code, for example, based on Eq. (35). Then the encoder can encode (2270) the intra prediction mode using the calculated number of bits and the encoder decides whether the current intra prediction mode is to be used based on the associated RD cost.

When used at the decoder side, the decoder determines whether the intra MPMs are used for the current block. If the decoder determines the MPMs are used, the decoder performs steps 2110-2130, similar to what are done for the encoder. Then the decoder can decode the intra prediction mode based on the MPM index. If the decoder determines that a fixed length code is used for the intra prediction mode, the decoder can calculates (2260) the number of bits for the fixed length code, and decode (2270) the intra prediction mode based on the number of bits for the fixed length code.

The proposed methods rely on the generic principles of deriving intra directional propagation modes from neighboring blocks, based on known geometric distortions.

For instance, quadratic curves can be added as another intra mode, depending on the type of video, the position and the size of the considered prediction block. In another example in which the video was shot with a wide angle/short focal length, some distortion may deform the straight lines. Cylindrical correction is sometimes used to reduce the distortion. In case the video is distorted, curvy intra prediction can often improve the compression efficiency by propagating reference pixels along deformed curves, especially on the borders. Of course, straight intra prediction is kept as a good estimate for a given block surface. In both cases, adapting the MPM derivation to the known distortion improves its performances.

Figure 22:
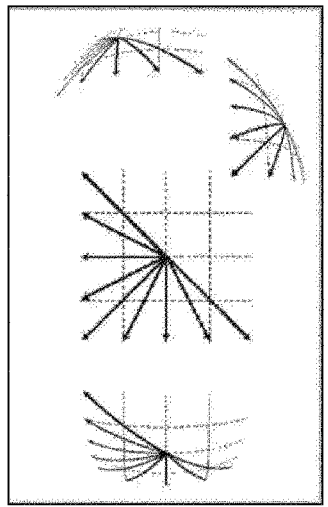
FIG. 22 illustrates how the straight intra modes vary over an exemplary frame in case of severe distortion.

FIG. 22 illustrates how the straight intra modes vary over an exemplary frame in case of severe distortion. In the above for equi-rectangular mapping, we describe that intra prediction is adapted in the vertical direction. It should be noted here for other types of video, for example, a short focal length video, because there might be a radial variation from the center of the lens, the intra prediction may also be adapted in the horizontal direction.

For short focal length video, a classical model for distortion is to use the Brown-Conrady model where the 2D+3D distortions are merged into a simple 2D function: $(x_d,y_d)=g(x_u,y_u,S)$, where $(x_d,y_d)$ is the pixel coordinate after distortion (in frame F) and $(x_u,y_u)$ is the pixels coordinate before distortion (in frame G). The distortion function go is the composition: $g=f^{-1} \circ 3d^{-1} \circ proj^{-1}$. The distortion function g( ) may be obtained using Brown-Conrady model.

In FIG. 22, close to the borders of the frame, directional modes vary from block to block, hence the need to adapt MPM derived from neighboring blocks. The principles described above, related to the proposed modification to the classical MPM process, can thus be applied considering this new transfer function g.

In FIG. 22, it can also be noticed that the number of available directions may differ from a location to another. At extreme locations the angle step between consecutive distorted directions can be too small to be considered. Therefore, the principles described above about reducing the number of directional modes, and thus syntax bits, can be applied.

Figure 23:
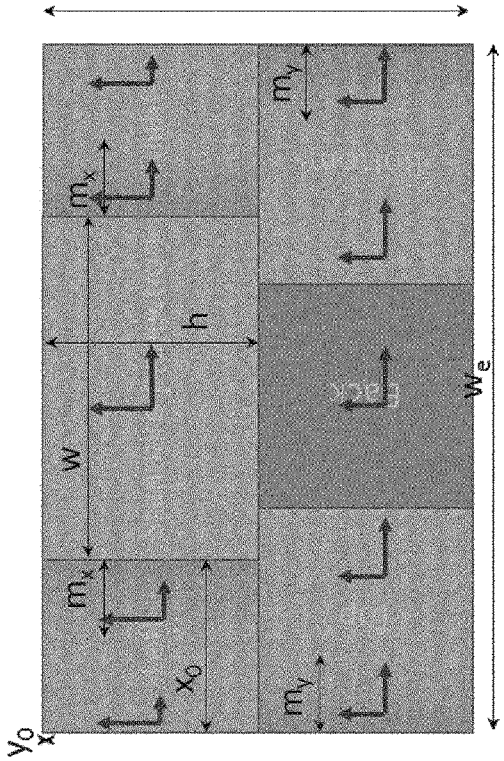
FIG. 23 illustrates an exemplary non-square cube mapped on a rectangular frame.

For non-square cube mapping, the local frame of reference becomes non-orthonormal in most parts of the image. FIG. 23 illustrates an exemplary non-square cube mapped on a rectangular frame. In this case, the resolution depends on the cube face.

As the number of available directions is changed, only the available directions are tested at the encoder side, even if all directions are available (no change in the codec). In this case, the number of directions is adapted accordingly by changing $N^+(a)/N^-(a)$ and $Z^+(a)/Z^-(a)$.

In order to use this new intra direction list processing, a flag can be set:

At PPS (Picture Parameter Set) level to indicate if this tool is available. This flag is possibly the same as the new MPM procedure for omnidirectional videos.

At block (CTU/CU/PU) level to indicate the policy of the intra direction processing.

If the flag is set to 1, the number of intra directions decreases as described above. A list of available intra prediction directions is computed at both encoder and decoder sides based on the mapping.

The number of available directions can also be transmitted to the decoder, hence independent of the mapping type of the image.

At PPS level to indicate the number of intra directions available for the current frame. The number of possible directions can be indexed per row or column, or per image area (slice, tiles etc.)

At CTU/CU/PU level to indicate the number of intra directions available for the considered block, possibly coded using differential/contextual coding, taking into account surrounding blocks.

Various embodiments are discussed about for the MPMs for intra prediction during video encoding and decoding. For example, we may align the MPMs as shown in TABLE 3 or reducing the number of intra prediction directional modes as shown in FIG. 19. These different embodiments can be used separately or in combination.

Figure 24:
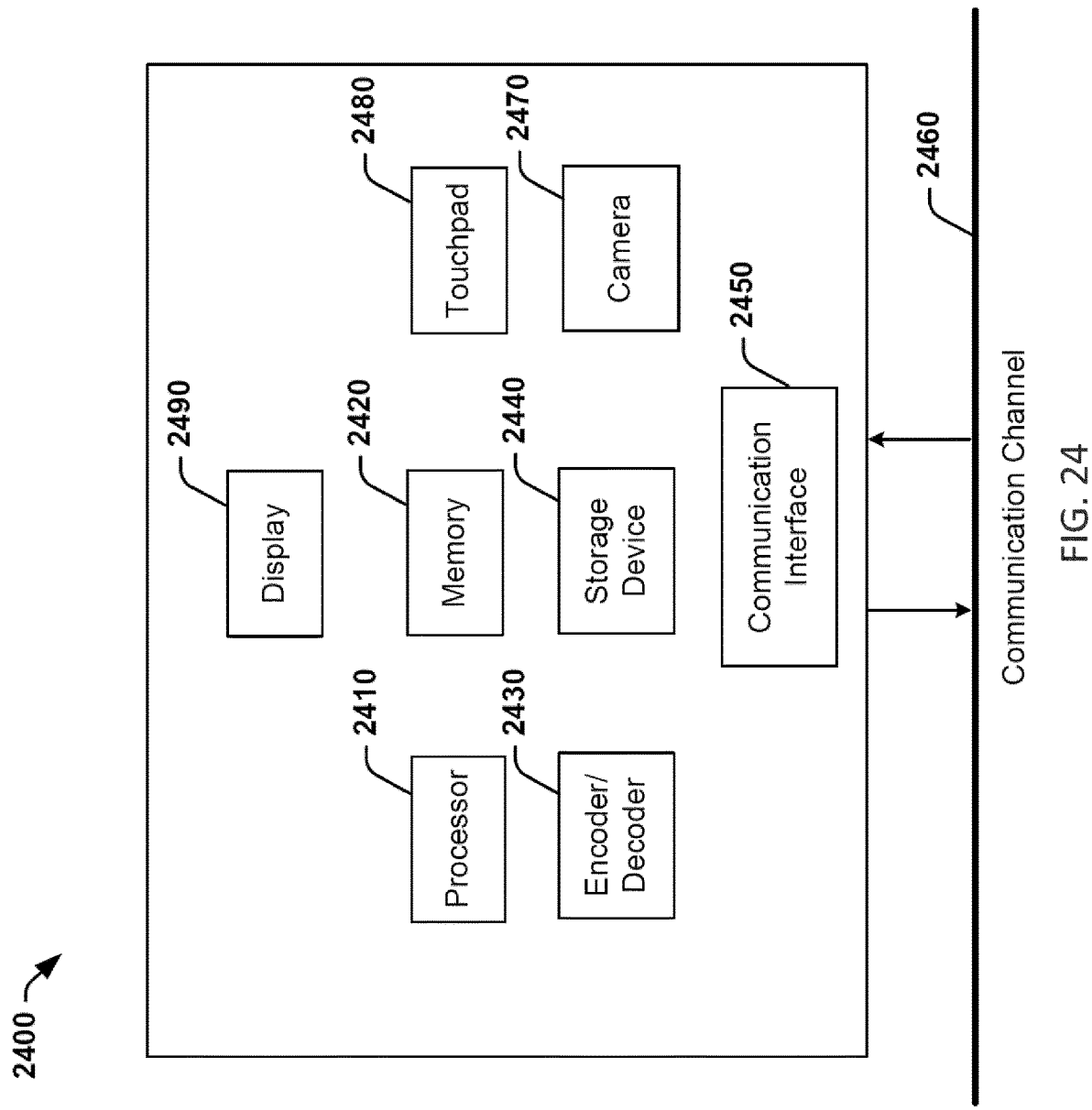
FIG. 24 illustrates a block diagram of an exemplary system in which various aspects of the exemplary embodiments of the present principles may be implemented.

FIG. 24 illustrates a block diagram of an exemplary system 2400 in which various aspects of the exemplary embodiments of the present principles may be implemented. System 2400 may be embodied as a device including the various components described below and is configured to perform the processes described above. Examples of such devices, include, but are not limited to, HMDs, personal computers, laptop computers, smartphones, tablet computers, digital multimedia set top boxes, digital television receivers, personal video recording systems, connected home appliances, and servers. System 2400 may comprise sensors, and may be communicatively coupled to other similar systems via a communication channel as shown in FIG. 24 and as known by those skilled in the art to implement the exemplary video system described above.

The system 2400 may include at least one processor 2410 configured to execute instructions loaded therein for implementing the various processes as discussed above. Processor 2410 may include embedded memory, input output interface and various other circuitries as known in the art. The system 2400 may also include at least one memory 2420 (e.g., a volatile memory device, a non-volatile memory device). System 2400 may additionally include a storage device 2440, which may include non-volatile memory, including, but not limited to, EEPROM, ROM, PROM, RAM, DRAM, SRAM, flash, magnetic disk drive, and/or optical disk drive. The storage device 2440 may comprise an internal storage device, an attached storage device and/or a network accessible storage device, as non-limiting examples. System 2400 may also include an encoder/decoder module 2430 configured to process data to provide an encoded video or decoded video.

Encoder/decoder module 2430 represents the module(s) that may be included in a device to perform the encoding and/or decoding functions. Encoder 500 and decoder 700 may be used in encoder/decoder module 2430. As is known, a device may include one or both of the encoding and decoding modules. Additionally, encoder/decoder module 2430 may be implemented as a separate element of system 2400 or may be incorporated within processors 2410 as a combination of hardware and software as known to those skilled in the art.

System 2400 may further include a display (2490) or may be communicatively coupled to the display via the communication channel. The display is, for example of OLED or LCD type. The display can also be an immersive (projective) wall, which is usually of a huge size.

System 2400 may further comprise a touch surface 2480 (e.g. a touchpad or a tactile screen) and a camera 2470. Processor 2410 may process signals received from sensors, which may or may not be part of system 2400. Some of the measurements from sensors can be used to compute the pose of system 2400 or of another device connected to system 2400. Camera 2470 may capture images of the environment for image processing. Processor 2410 may also perform the pre-processing and post-processing functions as described in FIG. 1.

Program code to be loaded onto processors 2410 to perform the various processes described hereinabove may be stored in storage device 2440 and subsequently loaded onto memory 2420 for execution by processors 2410. In accordance with the exemplary embodiments of the present principles, one or more of the processor(s) 2410, memory 2420, storage device 2440 and encoder/decoder module 2430 may store one or more of the various items during the performance of the processes discussed herein above, including, but not limited to the input video, the bitstream, equations, formula, matrices, variables, operations, and operational logic.

The system 2400 may also include communication interface 2450 that enables communication with other devices via communication channel 2460. The communication interface 2450 may include, but is not limited to a transceiver configured to transmit and receive data from communication channel 2460. The communication interface may include, but is not limited to, a modem or network card and the communication channel may be implemented within a wired and/or wireless medium. The various components of system 2400 may be connected or communicatively coupled together using various suitable connections, including, but not limited to internal buses, wires, and printed circuit boards.

The exemplary embodiments according to the present principles may be carried out by computer software implemented by the processor 2410 or by hardware, or by a combination of hardware and software. As a non-limiting example, the exemplary embodiments according to the present principles may be implemented by one or more integrated circuits. The memory 2420 may be of any type appropriate to the technical environment and may be implemented using any appropriate data storage technology, such as optical memory devices, magnetic memory devices, semiconductor-based memory devices, fixed memory and removable memory, as non-limiting examples. The processor 2410 may be of any type appropriate to the technical environment, and may encompass one or more of microprocessors, general purpose computers, special purpose computers and processors based on a multi-core architecture, as non-limiting examples.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the angles and mode indices used for intra prediction. It should be noted that the specific values are for exemplary purposes and the present principles are not limited to these specific values.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of encoding or decoding video data, comprising:
   determining an intra prediction mode from a set of available intra prediction modes for a block of a picture, wherein a number of the available intra prediction modes in the set depends on a vertical position of the block, and wherein the number of available intra prediction modes for the block is smaller than a number of available intra prediction modes for a second block, when the block is further away from the center of the picture in a vertical direction than the second block; and
   encoding or decoding the block using the determined intra prediction mode.

2. The method of claim 1, wherein the intra prediction mode for the block is encoded using a fixed length code, a length of the fixed length code being based on the number of available intra prediction modes in the set, and wherein the length of the fixed length code depends on the vertical position of the block.

3. The method of claim 1, wherein an angle difference between two adjacent intra prediction modes in the available intra prediction modes is based on the location of the block.

4. The method of claim 1, further comprising:
determining a first most probable mode for the block based on an intra prediction mode of a neighboring block; and
determining a second most probable mode for the block based on the first most probable mode, wherein an angle difference between the first most probable mode and the second most probable mode is based on the location of the block.

5. The method of claim 4, wherein the intra prediction mode for the block is selected to be one of the first most probable mode and the second probable mode.

6. The method of claim 1, the picture having a first block and a second block, wherein a first set of available intra prediction modes for the first block is different from a second set of available intra prediction modes for the second block, and wherein a first angle difference between two adjacent intra prediction modes in the first set of available intra prediction modes is same as a second angle difference between two adjacent intra prediction modes in the second set of available intra prediction modes.

7. The method of claim 1, the picture having a first block and a second block, wherein a first set of available intra prediction modes for the first block is different from a second set of available intra prediction modes for the second block, wherein the first set of available intra prediction modes for the first block is represented by a first set of contiguous intra prediction mode indices, wherein the second set of available intra prediction modes for the second block is represented by a second set of contiguous intra prediction mode indices.

8. The method of claim 7, wherein a same intra prediction mode index in the first set of available intra prediction modes and the second set of available intra prediction modes corresponds to a same intra prediction mode.

9. The method of claim 1, wherein a look-up table is used to associate the number of available intra prediction modes in the set for the block with the location of the block.

10. An apparatus for encoding or decoding video data, comprising one or more processors, wherein the one or more processors are configured to:
determine an intra prediction mode from a set of available intra prediction modes for the block, wherein a number of the available intra prediction modes in the set depends on a vertical position for the block, and wherein the number of available intra prediction modes for the block is smaller than a number of available intra prediction modes for a second block, when the block is further away from the center of the picture in a vertical direction than the second block; and
encode or decode the block using the determined intra prediction mode.

11. The apparatus of claim 10, wherein the intra prediction mode for the block is encoded using a fixed length code, a length of the fixed length code being based on the number of available intra prediction modes in the set, and wherein the length of the fixed length code depends on the vertical position of the block.

12. The apparatus of claim 10, wherein an angle difference between two adjacent intra prediction modes in the available intra prediction modes is based on the location of the block.

13. The apparatus of claim 10, wherein said one or more processors are further configured to:
determine a first most probable mode for the block based on an intra prediction mode of a neighboring block; and
determine a second most probable mode for the block based on the first most probable mode, wherein an angle difference between the first most probable mode and the second most probable mode is based on the location of the block.

14. The apparatus of claim 13, wherein the intra prediction mode for the block is selected to be one of the first most probable mode and the second probable mode.

15. The apparatus of claim 10, the picture having a first block and a second block, wherein a first set of available intra prediction modes for the first block is different from a second set of available intra prediction modes for the second block, and wherein a first angle difference between two adjacent intra prediction modes in the first set of available intra prediction modes is same as a second angle difference between two adjacent intra prediction modes in the second set of available intra prediction modes.

16. The apparatus of claim 10, the picture having a first block and a second block, wherein a first set of available intra prediction modes for the first block is different from a second set of available intra prediction modes for the second block, wherein the first set of available intra prediction modes for the first block is represented by a first set of contiguous intra prediction mode indices, wherein the second set of available intra prediction modes for the second block is represented by a second set of contiguous intra prediction mode indices.

17. The apparatus of claim 16, wherein a same intra prediction mode index in the first set of available intra prediction modes and the second set of available intra prediction modes corresponds to a same intra prediction mode.

18. The apparatus of claim 10, wherein a look-up table is used to associate the number of available intra prediction modes in the set for the block with the location of the block.

* * * * *